US006456025B2

(12) United States Patent
Berkowitz et al.

(10) Patent No.: US 6,456,025 B2
(45) Date of Patent: Sep. 24, 2002

(54) MOTOR OPERATOR FOR OVER-HEAD AIR BREAK ELECTRICAL POWER DISTRIBUTION SWITCHES

(75) Inventors: Donald S. Berkowitz, Redmond, WA (US); Witold Bik, El Cerrito; John Hammons, Walnut Creek, both of CA (US); Jeff Heckathorn, Everett, WA (US); Stephen F. Isaacson, Brentwood, CA (US); Terry R. Klusmeyer, Garner, NC (US); William Christian Tracy Nelson, Duvall, WA (US)

(73) Assignee: EnergyLine Systems, Inc., Alameda, CA (US)

( * ) Notice: Subject to any disclaimer, the term of this patent is extended or adjusted under 35 U.S.C. 154(b) by 7 days.

(21) Appl. No.: 09/802,780

(22) Filed: Mar. 8, 2001

Related U.S. Application Data

(63) Continuation of application No. 09/285,498, filed on Apr. 1, 1999, now Pat. No. 6,215,263.
(60) Provisional application No. 60/080,718, filed on Apr. 3, 1998.

(51) Int. Cl.[7] .............................................. H01H 71/10
(52) U.S. Cl. ........................ 318/272; 318/264; 318/286; 307/139; 307/143
(58) Field of Search ................................ 318/256, 257, 318/264, 265, 266, 272, 283, 286, 432, 433, 466, 468; 307/112, 116, 125, 126, 139, 143

(56) References Cited

U.S. PATENT DOCUMENTS 3,838,233 A * 9/1974 Bridges ..................... 200/48 R
3,999,106 A 12/1976 Kratomi (List continued on next page.)

OTHER PUBLICATIONS

Bulletin DB–128A94 "Motor Operators for Transmission and Distribution Automation", Types BR, BT–D and BT–T, pp. 1–6; includes Dwg. Nos. C128A951, C128A969, C128A116, C128B069, CB29SC03, CB29PG02, CB29PG01; ADMO Characteristics—Version II chart; Instruction Book IB–AA10–019D, pp. 1–3; Sep., 1997; Instruction Book IB–AA10–023A, pp. 1–3, Jun., 1998; Technical Specifications Remote Controlled Switch Operator—Distribution Class, Jul., 1998, pp. 1–26, Cleaveland/ Price Inc., 1998.

*Primary Examiner*—Bentsu Ro
(74) *Attorney, Agent, or Firm*—James V. Lapacek; Graybeal Jackson Haley LLP

(57) ABSTRACT

A motor operator for an overhead power switch is disclosed including a microcontroller, a unique and powerful array of well-integrated sensors, a motor and drive developing substantial torque and speed and coupled to a switch actuator and responsive to the microcontroller, and a sophisticated program algorithm stored in memory at the actuator site for dynamically controlling, i.e., governing the various control modes as called for by changing conditions. The sensors include an encoder associated with the motor and drive that develops position information signals fed to the dynamic microcontroller to compute real time information including position, speed, and stopping distance used in conjunction with remote operate commands to open, close and monitor status of the switch in the various ways disclosed. Under the supervision of the microcontroller, a motor drive power switching circuit selectively applies a source of power, such as from an on site battery, to an electric motor to drive the switch toward open or closed position at different speeds, output force levels such as at different torques, and in continuous or incremental movements depending on conditions determined by the microcontroller in response to sensor inputs.

5 Claims, 22 Drawing Sheets

U.S. PATENT DOCUMENTS

| | | |
|---|---|---|
| 4,020,432 A | 4/1977 | Erickson et al. |
| 4,045,714 A | 8/1977 | MacLeod |
| 4,128,856 A | 12/1978 | MacLeod |
| 4,179,646 A | 12/1979 | Russell |
| 4,291,236 A * | 9/1981 | Patton .................. 307/40 |
| 4,357,505 A | 11/1982 | Bridges |
| 4,677,262 A | 6/1987 | Ramos et al. |
| 4,794,314 A | 12/1988 | Janu et al. |
| 4,804,809 A | 2/1989 | Thompson, Jr. et al. |
| 5,025,171 A | 6/1991 | Fanta et al. |
| 5,091,616 A * | 2/1992 | Ramos et al. .......... 200/146 R |
| 5,534,858 A | 7/1996 | Tinkham |
| 5,550,476 A * | 8/1996 | Lau et al. .................. 324/522 |
| 5,552,647 A | 9/1996 | Tinkham |
| 5,566,041 A | 10/1996 | Rumfield |
| 5,804,930 A | 9/1998 | Panto |
| 5,856,642 A | 1/1999 | Sanders |
| 5,874,900 A | 2/1999 | Panto |
| 5,895,987 A | 4/1999 | Lo et al. |
| 6,025,657 A | 2/2000 | Lo et al. |
| 6,239,960 B1 * | 5/2001 | Martin ...................... 361/86 |

\* cited by examiner

MANUAL OPERATION NOTES

CAUTION: SWITCH MAY OPERATE AUTOMATICALLY IF AUTOMATIC OPERATION IS NOT DISABLED

TO OPERATE SWITCH:
(I) REMOTE/LOCAL SWITCH MUST BE IN "LOCAL" POSITION.
(II) OPERATE USING CLOSE/OPEN SWITCH.

TO RETURN TO REMOTE OPERATION:
REMOTE/LOCAL SWITCH MUST BE IN "REMOTE" POSITION

TO ALIGN/COUPLE OPERATOR TO SWITCH (ALIGN MODE):
(I) REMOTE/LOCAL SWITCH MUST BE IN "LOCAL" POSITION.
(II) TOGGLE "ALIGN/COUPLE" SWITCH. "NOT READY" LAMP WILL BLINK INDICATING ALIGN (SLOW OPERATION) MODE.
(III) USE CLOSE/OPEN SWITCH TO ALIGN OPERATOR WITH OVERHEAD SWITCH. NOTE: MOTOR WILL NOT RUN UNLESS HANDLE IS STORED ON CABINET DOOR. USE HANDLE TO ENGAGE COUPLING.
(IV) TOGGLE "ALIGN/COUPLE" SWITCH. "NOT READY" LAMP WILL STOP BLINKING. IF PROBLEMS PREVENT OPERATION, "NOT READY" LAMP WILL BE ON, OTHERWISE IT WILL INDICATE SWITCH IS READY.

ONE SHOT TO "LOCK OUT" FEATURE:
(I) PLACE REMOTE/LOCAL SWITCH IN "LOCAL" POSITION
(II) HOLD AUTOMATIC OPERATION SWITCH IN "ENABLE" POSITION AND WHILE AUTOMATIC ENABLE LAMP IS BLINKING, TOGGLE CLOSE/OPEN SWITCH TO "CLOSE" POSITION".
(III) IF FAULT STILL PRESENT, SWITCH WILL OPEN ON FIRST RECLOSER OPERATION.

FIG.6A CONT.

TO SET LIMITS OF OPERATOR TRAVEL (LIMIT SWITCHES):
(I) REMOTE/LOCAL SWITCH MUST BE IN "LOCAL" POSITION.
(II) UNCOUPLE OPERATOR AND OVERHEAD SWITCH. USE MANUAL HANDLE TO CLOSE SWITCH.
(III) COUPLE OPERATOR TO SWITCH (SEE ALIGN/COUPLE SECTION ABOVE). NOTE: SWITCH SHOULD BE COUPLED IN SLACK (UNTENSIONED) POSITION.
(IV) SET CLOSE LIMIT: RAISE "SET LIMITS" SWITCH (BEHIND FRONT PANEL) WHILE TOGGLING CLOSE/OPEN SWITCH IN "CLOSE" POSITION. RELEASE BOTH SWITCHES. OPERATOR WILL SLOWLY MOVE IN CLOSE DIRECTION UNTIL SWITCH IS CLOSED AND UNDER TENSION. "CLOSED" LAMP WILL CHANGE FROM BLINKING TO ON INDICATING CLOSE LIMIT IS SET. IF "CLOSED" LAMP GOES OUT, MAKE SURE OPERATOR IS COUPLED. "OPEN" LAMP WILL BLINK IF OPEN POSITION NOT SET SINCE CABINET DOOR OPENED.
(V) USE CLOSE/OPEN SWITCH TO POSITION OVERHEAD SWITCH IN DESIRED OPEN RESTING POSITION. LEAVE CLEARANCE FOR OVERTRAVEL.
(VI) SET OPEN LIMIT: RAISE "SET LIMITS" SWITCH (BEHIND FRONT PANEL) WHILE TOGGLING CLOSE/OPEN SWITCH IN "OPEN" POSITION. OPEN LAMP WILL CHANGE FROM BLINKING TO ON INDICATING OPEN LIMIT IS SET. "NOT READY" LAMP WILL TURN OFF. CONSULT USERS MANUAL AND SETUP SOFTWARE IF ERROR LED COMES ON, OR CLOSE/OPEN LEDS DO NOT OPERATE AS DESCRIBED.

TEST TRAVEL LIMITS-UNCOUPLED
(I) REMOTE/LOCAL SWITCH MUST BE IN "LOCAL" POSITION. RAISE "ALIGN/COUPLE" SWITCH AND CLOSE/OPEN SWITCH. THIS OPERATING MODE WILL NOT RETENSION SWITCH ON "CLOSE" OPERATION.

FIG. 6B

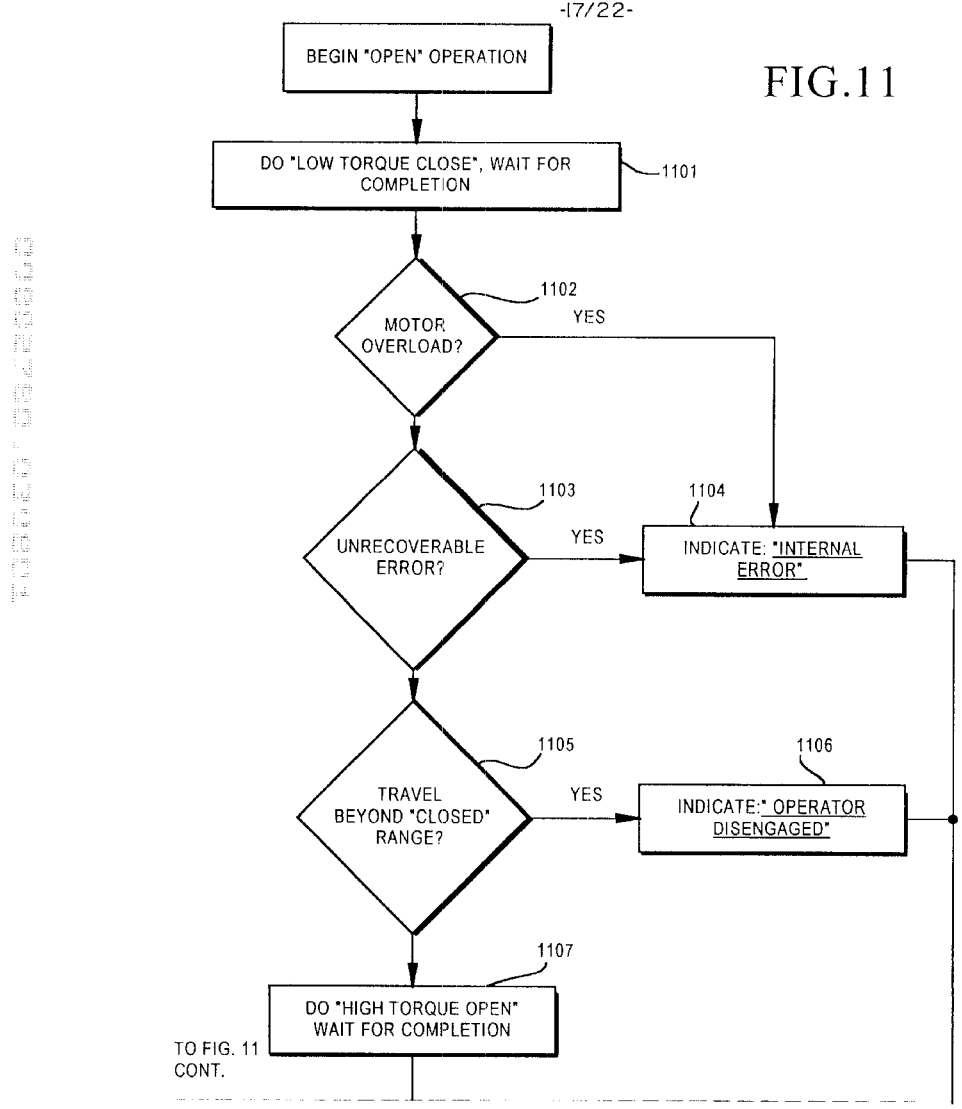

MOTOR OPERATOR FOR OVER-HEAD AIR BREAK ELECTRICAL POWER DISTRIBUTION SWITCHES

CROSS REFERENCE TO RELATED APPLICATION

This application is a Continuation of application Ser. No. 09/285,498, filed Apr. 1, 1999, now U.S. Pat. No. 6,215,263, which claims the benefit of a Provisional Application 60/080,718, filed Apr. 3, 1998.

BACKGROUND OF THE INVENTION

1. Field of the Invention

The present invention relates to remotely controlled actuators for opening, closing and monitoring status of electrical power distribution switches of the type commonly used on overhead pole installations which close the contacts to carry high current—voltage and open to break the circuit with an ambient air gap separating the contacts.

2. Background Art

The most predominant method for routing electrical power to utility customers is through the use of single or three-phase electrical circuits carried on overhead power distribution lines. To allow these circuits to be disconnected, rerouted or otherwise reconfigured, air-break, single or gang-operated three-phase switches are commonly employed. These switches are typically mounted at the top of a wood, steel or concrete pole, and the operating actuator is typically carried down the pole on a wood, steel or fiberglass rod or shaft. The method for operating these switches is primarily manual, with a human operator or "lineman" unlocking a security padlock and operating a handle or shaft to close/open the switch. Both rotating shafts, requiring torsional operation, and reciprocating shafts, requiring and up and down operation of the shaft are commonly in use.

Within the last several decades, as automation and remote operation of the power system have become more economically feasible, motor-driven systems (motor operators) for automatically operating the actuator shafts for these switches have become available. These systems must derive their power from DC batteries to allow the switch to be operated when AC electrical power is not available. Most of these systems are outfitted with a simple, microprocessor-based computer known in the industry as a Remote Terminal Unit (RTU) which allows the actuator/switch assembly to be operated remotely using radio, fiber, telephone or other commonly available data communication technologies.

Inside the motor operator various techniques have been developed for converting the electromotive force of the motor into the force necessary to operate the actuator shaft through a rotation of approximately 90 degrees (for the torsional operated actuator) or through a vertical motion of approximately one foot (for the reciprocating actuator). The most common methods have involved either an A.C./D.C. motor and gearbox assembly or a variety of hydraulic arrangements involving electric motor-driven pumps, pressure chambers, valves, etc.

One feature common to all of these motor operators is an operating requirement that the power distribution switch contacts be positioned and tensioned properly and that the closing and opening motion of the actuator be crisp and fast. This is necessary to ensure that when closed, the switch contacts provide maximum surface area for current flow and are firmly held in place to prevent vibration and arcing due to the alternating EMF. During opening and closing operations, arcing around the contacts will occur. Proper extinguishing of the arc requires that the switch mechanism move quickly.

Although the switch assemblies require fairly precise operation of the actuator shaft, the control systems for these motor operators have typically been fairly simple, consisting of electromechanical assemblies of actuating relays or motor contactors which are engaged to initiate an operation, and electromechanical limit switches on the output shaft that automatically stop the motor and perform any related functions (close valves, apply brakes, etc.) at or near the desired stopping point. For the vast majority of these control systems, feedback to the lineman, remote human operator or automated switching system has been fairly primitive, consisting of simple indications of battery status, switch position and other indications that can be developed from proximity sensors such as whether or not the cabinet door is open, the manual operating handle is present in the cabinet, or the operator and its actuator assembly are mechanically engaged.

These operators have performed reasonably well under ideal conditions at the time of initial commissioning. However, many problems arise as environmental factors cause changes to the operating conditions of the switch assemblies, operators and available energy in batteries. These problems can result in improper switch operation with potentially serious implications.

The most obvious problems result from one or more of the switch contacts becoming stuck to its mating surface due to a buildup of ice or due to welding (caused by high-current surges related to lightning discharge). This will generally leave the motor running until its circuit breaker or fuse trips. Unless the breaker automatically resets, the switch will require immediate, human intervention, and even with automatic resetting, further successful operation is unlikely. A further undesirable circumstance is that the mechanism is tensioned to open. In the case of a welded contact, the non-welded contacts are no longer firmly held in position. In the case of ice, melting of the ice before the problem is corrected could leave the switch partially open.

Another problem relates to variations in the force necessary to overcome the problem of stuck or sticky switch contacts and debris or ice buildup. The operator must be designed to apply the necessary force without applying so much force that the switching mechanism is readily damaged. Since the force applied to the switch depends on many factors, this is a difficult problem to solve with a simple, electromechanical design. In the event that excessive force is applied for any reason, it is desirable to be able to indicate this to the remote operator so that preventative maintenance or inspection can be performed.

Another problem results from uncontrollable variations in speed of operation. These variations are caused by variations in the voltage supplied from the battery due to state of charge, age, temperature, etc. They are also caused by variations in the condition of the switching mechanism including slack, corrosion, etc. In most cases, the limit switches used in existing operators must be set to trip prior to the desired stopping point to allow the operator to slow down and stop. This requires that the stopping distance be consistent with the initial setting of the limit switches. Changes in stopping distance based upon variation in speed at time of limit switch contact cannot be adequately taken into account in such an electromechanical arrangement.

Another problem with existing designs is the difficulty in creating indications for the remote operator when something otherwise obvious is wrong. For example, if the actuator is mechanically disengaged from the switch, the motor operator may appear to function normally but without moving the switch to the desired position. Although proximity sensors can be deployed to detect these conditions, these sensors must be placed in hostile, outdoor environments that are costly to properly instrument and unreliable in function.

Another problem relates to the complexity of adjusting the digital limit switches, and to their inherent unreliability. The mechanical adjustment of these switches is difficult to perform reliably, with only very subjective criteria for correct setting.

Another problem relates to the method of coupling the operator to the switch. This is typically performed with a slip fitting held in place with U-bolts. This allows the operator and switch to be mechanically connected without regard to limit switch settings. Without the slip fitting, typical operators would have to be somehow rotated to the correct position before the couplings were connected. These couplings are problematic and can slip during high-torque operation, causing the switch to go out of adjustment.

Another problem relates to the dangerous situation posed by a lineman operating the device from the front panel. Existing designs have no way to allow the operator to get out of the way before the switch operates.

SUMMARY OF THE INVENTION

The present invention solves these problems with an operator combining a microcontroller, i.e., microcomputer-based control, a unique and powerful array of well-integrated sensors, a motor and drive developing substantial torque and speed coupled to the actuator and responsive to the microcontroller, and a sophisticated program algorithm stored in memory at the actuator site for dynamically controlling, i.e., governing the various control modes as called for by changing conditions. The sensors include an encoder associated with the motor and drive that develops position information signals fed to the dynamic microcontroller to compute real-time information including position, speed, and stopping distance used in conjunction with remote operate commands to open, close and monitor status of the switch in the various ways disclosed below. Under the supervision of the microcontroller, a motor drive power switching circuit selectively applies a source of power, such as from an on-site battery, to an electric motor to drive the switch toward open or closed position at different speeds, output force levels such as at different torques, and in continuous or incremental movements depending on conditions determined by the microcontroller in response to sensor inputs.

In the preferred embodiment, the output load as seen by the motor and drive is sensed by monitoring voltage drop across a resistor in circuit with the motor current. The sensed load is fed to the microcontroller as an input and used by the intelligence of the algorithm for switch actuation. For example, if together the inputs to the mircocontroller indicate an ice blockage at the distribution switch, then a preprogrammed opening or closing sequence is used especially created for that unique obstacle. Motor operator torque and/or speed are preferably changed by a switchable impedance element such as a resistor in the motor battery circuit.

Also in the preferred embodiment, the control algorithm distinguishes between the operation to open the switch (OPEN), and the operation to close it (CLOSE). OPEN begins with the actuator moving in the CLOSE direction to determine if the operator is decoupled, followed by a high-torque OPEN operation to move the contacts free of their mating surfaces as quickly as possible to extinguish arcing that would be caused by the switch opening when energized. CLOSE begins with a low torque operation which will prevent damage to the control arms in the case that ice has caused one but not all of the arms to be somehow stuck to the switch body. After a brief delay in the CLOSE operation, the control switches to high-torque mode, generating higher speed and torque as the blades approach their mating surfaces. The operation terminates at a stopping-end point with the switch contacts closed and under tension. A preferred closing sequence causes the motor to drive the actuator and hence switch contacts to a predetermined closed tension that uses the spring characteristics of the mechanical system existing between the motor and the switch including the actuator components such as the actuator rod.

A further aspect of the preferred embodiment provides motor startup, normal and overload shutdown under microcontroller control to facilitate automatic recovery from failure conditions and to provide additional status information to remote command stations or control systems for corrective action.

Another feature of the preferred control algorithm is precise battery monitoring and power management to ensure that the motor operator will deliver the specified torque and speed, to maximize battery carryover, provide valuable remote indications of battery condition, and provide orderly shutdown at end of discharge.

It is also an aspect of the preferred embodiment that the stopping distance of the motor and hence actuated switch contacts are dynamically computed from the sensed signals fed to the microcontroller. Such stopping distance calculation is used by the microcontroller to drive the switch contacts to the precise end-point positioning needed, under variable motor and actuator speed.

Additionally, the algorithm of the microcontroller has "jog" modes in which the power to the motor is applied incrementally to in effect step the actuator by small amounts for different conditions including precise positioning and adjustment of the actuator rod torque.

Other aspects of the invention in the preferred embodiment include:

a method for sensing and indicating failure conditions of the motor operator that require and can only be cleared by local inspection of the equipment;

a microcontroller-based control system that can intelligently take action in the event that the normal operation fails to produce the expected result;

multiple levels of torque control of the switch mechanism to prevent damage caused by incomplete switch operations which leave the switch contacts in any position other than fully open, or fully closed;

the ability to select a final torque value for the control rod in the closed position without requiring any mechanical adjustments;

in the event of motor overload, shutting down the motor before damage occurs or circuit breakers/fuses operate requiring service calls, and after shut-down, reversing the motor direction to bring the switch back to a normal or more-normal condition;

monitoring battery voltage in conjunction with motor current to be able to detect motor overload at low voltage levels which might not otherwise trip simple overcurrent detection devices;

eliminating the need for non-rigid actuator-switch couplings by providing the above mentioned jog modes;

dynamic braking in the motor operator to rapidly and repeatedly stop the switch;

correction of the dynamic braking distance due to the effects of temperature on the electrical conductivity of components;

control logic or algorithm to reliably determine whether an electrical distribution switch is open, closed or decoupled from an automatic operating mechanism;

measurement of energy available in a battery system to deliver a required amount of output torque through a motor utilizing such as by measurement of battery voltage through the instantaneous removal of surface charge by disconnecting charging means, applying a large, fixed load, disconnecting the load and then measuring the resulting voltage;

measurement of battery voltage under a large, fixed load and projection of battery voltage in response to motor locked rotor conditions by multiplying the difference between the loaded and unloaded battery voltage levels, and finally correcting the result by applying a fixed correction factor;

equipping the microcontroller with optical isolation coupler for enabling hookup of a service computer to afford local control and fault testing at the motor operator site; and incorporating a controlled cabinet heater in the housing for the motor operator and controlling it by a temperature sensor input to the microcontroller to prevent condensation.

BRIEF DESCRIPTION OF THE DRAWINGS

The foregoing and other aspects of the invention will be more fully appreciated when considered in light of the following specification and drawings in which:

FIGS. 6a and 6b are respectively a layout of the indicators and manual switches, and certain instructions on the control panel at the site of the motor operator.

DETAILED DESCRIPTION OF THE PREFERRED EMBODIMENT

Figure 1:
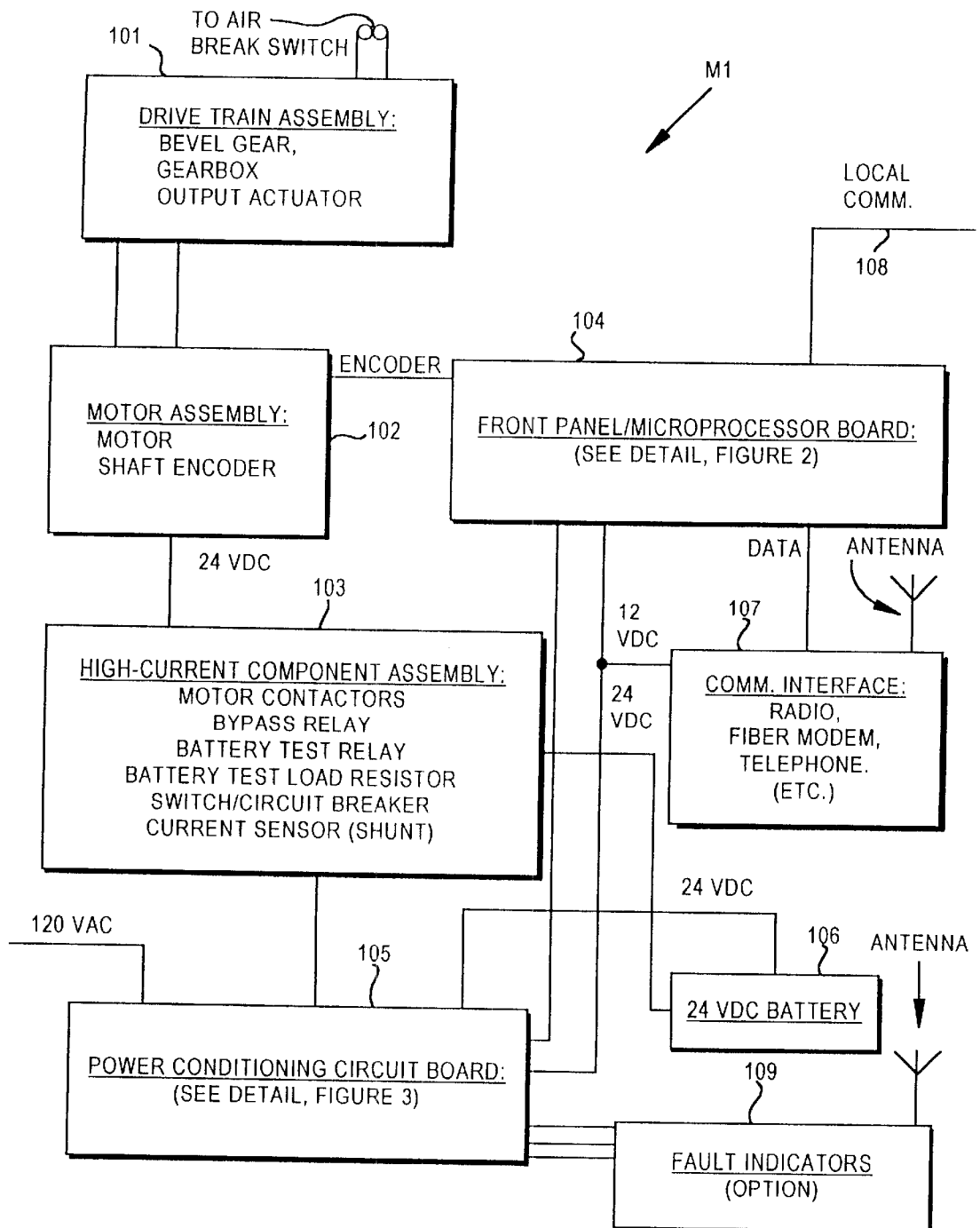
FIG. 1 is a functional block diagram of the preferred embodiment of the motor operator for overhead air break switches in electrical power distribution systems, in which the motor operator is constructed in accordance with the invention for operating the switch through an actuator mechanism.
Figure 2:
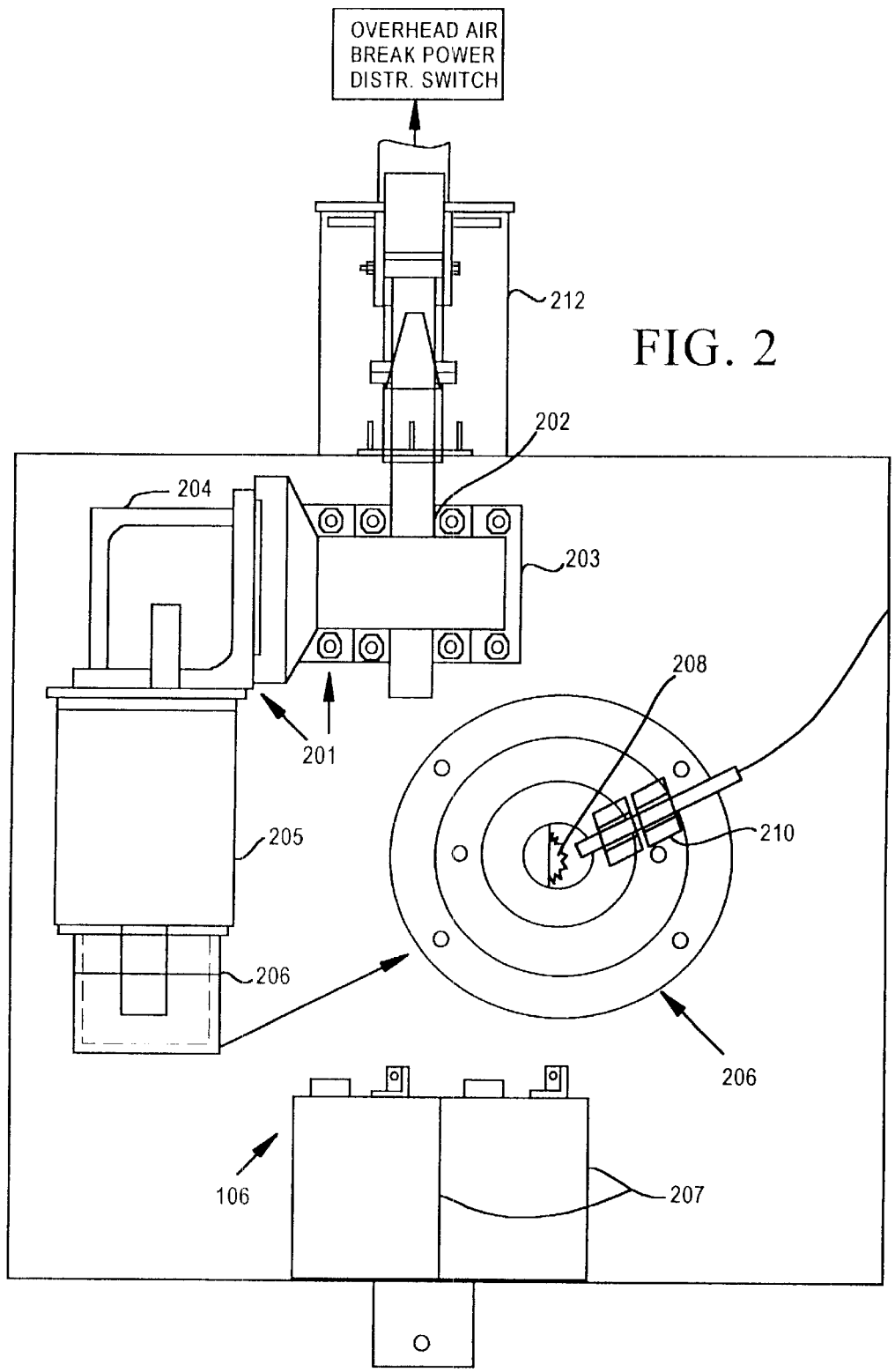
FIG. 2 is an elevation view of the layout of the principal mechanical components of the motor operator of FIG. 1.
Figure 3:
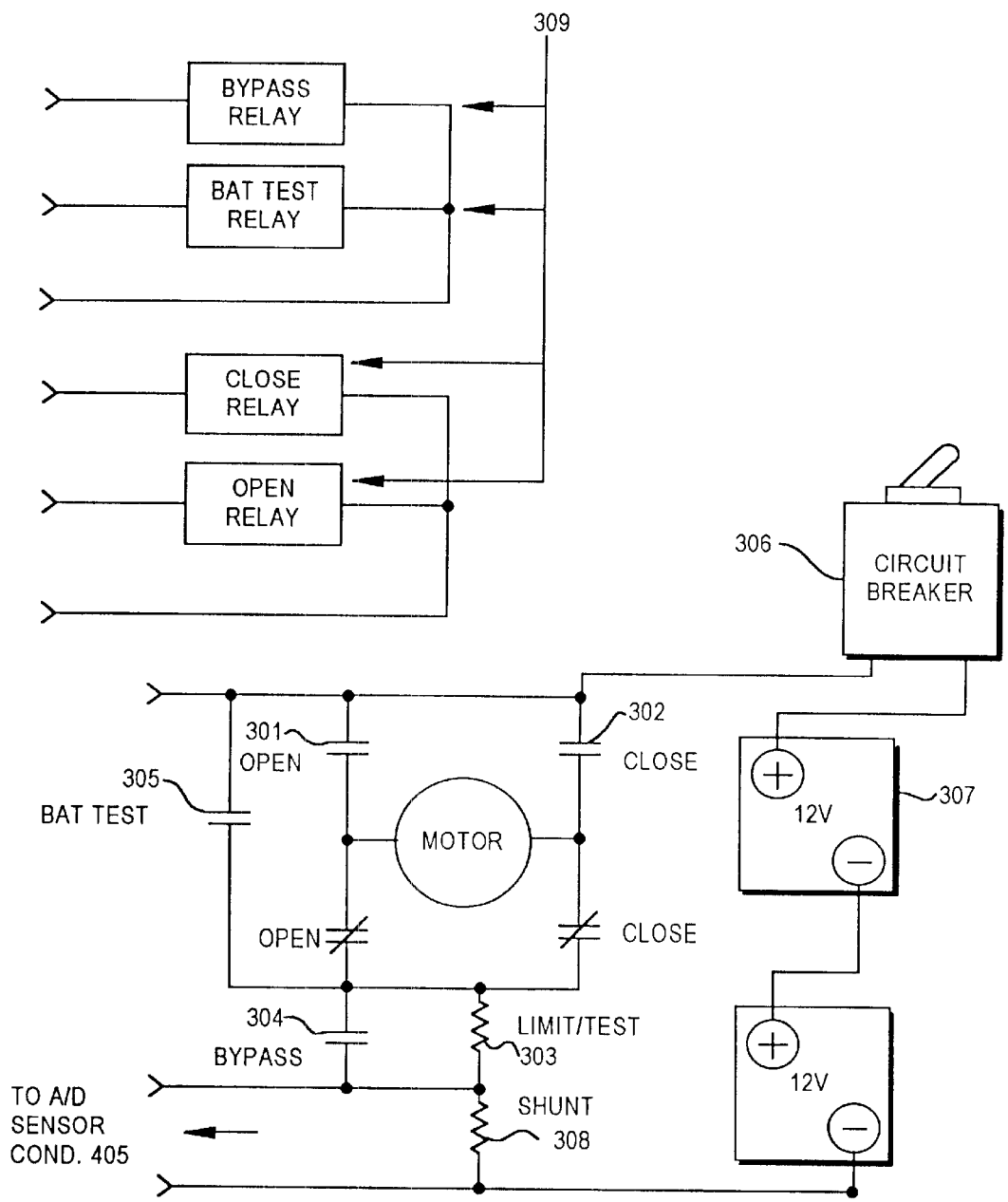
FIG. 3 is a schematic diagram of the principal electrical control and battery switching circuitry for the motor operator of FIGS. 1 and 2.
Figure 4:
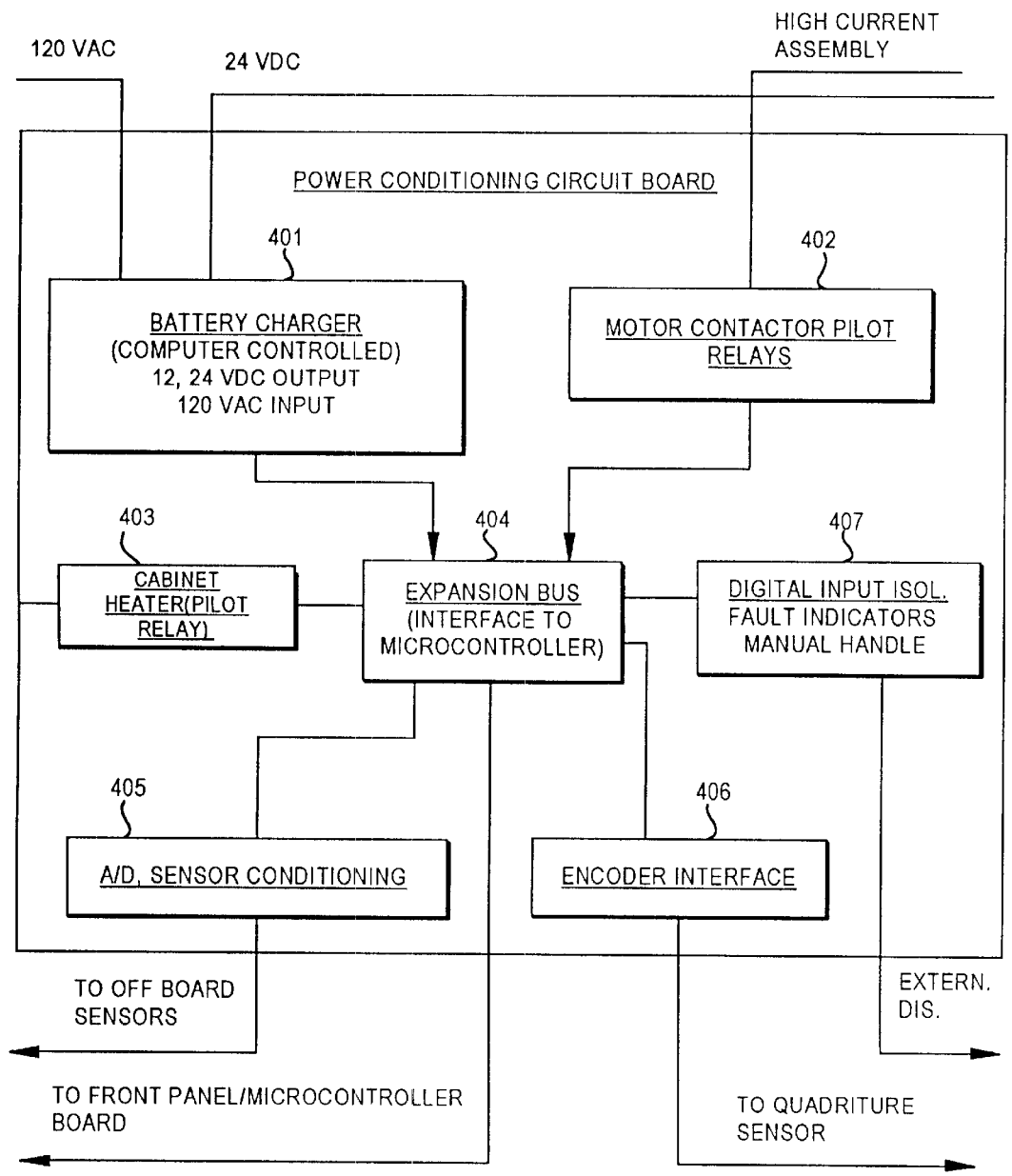
FIG. 4 is a functional block diagram of the main components of the front panel/microprocessor of FIG. 1.
Figure 5:
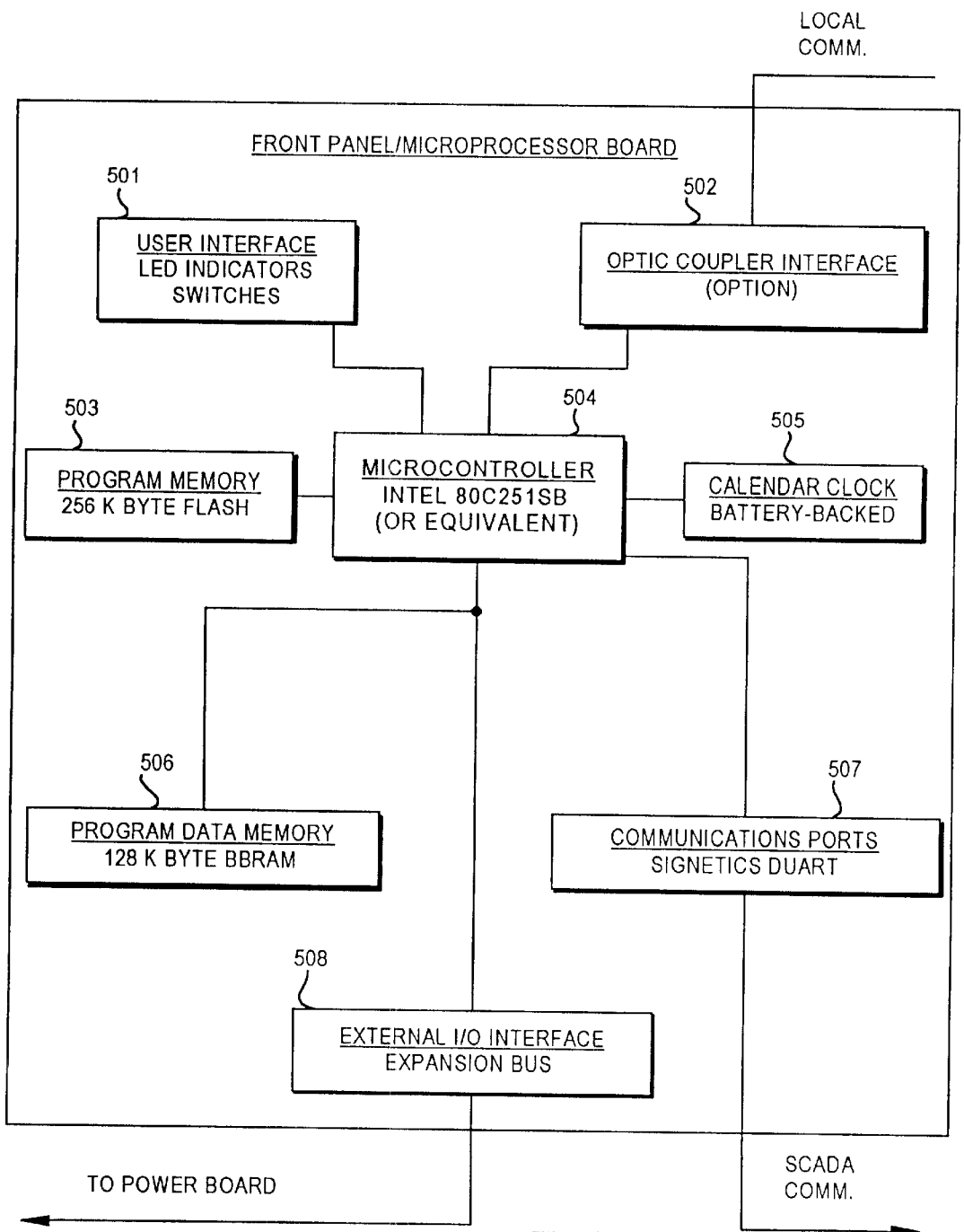
FIG. 5 is a functional block diagram of the main components of the power conditioning circuit board of FIG. 1.

FIG. 1 shows a preferred embodiment of the motor operator referred to herein as M1, in which the major functional components include: a drive train assembly (101) that is mechanically coupled to the distribution switch (see FIG. 2 which may be any of numerous air break-type switches mounted up pole and mechanically actuated by a pipe or rod extending down pole to the location of the motor operator M1); a motor assembly (102); a high-current component assembly (103); a front panel/microprocessor board (104); a power conditioning circuit board (105); a communication interface (107); storage battery (106) and fault indicators (109). FIG. 2 shows the layout of the mechanical components. FIG. 3 shows the wiring of the high-current components. FIGS. 4 and 5 expand on the descriptions of the Front Panel/Microcontroller Board and the Power Conditioning Board. FIGS. 6 and 6b show the switches, LEDs and front panel graphics.

The drive train assembly (101, 201), provides the mechanical drive for the output actuator (202). In the preferred embodiment, a worm-drive gearbox (203) provides the mechanical advantage for the M1 motor operator. Although many other gearboxes and gearbox ratios can be used, this unit has the very desirable feature of being impossible to rotate from the output actuator end, ensuring a stable position when the operator is stationary. A 90 degree, 1:1 ratio bevel gear assembly (204) is attached to the gearbox and allows the output shaft to be easily positioned in the center of the box (torsional units only). This assembly mounts inside the enclosure, although any other bevel gear assembly could be used as long as it provides the desired efficiency and ratiometric requirements for the application.

The motor assembly (102, 205) includes the motor and a digital shaft encoder assembly (206) for monitoring motor motion although the encoder can also be mounted on the bevel gear assembly. A 3.6 horsepower, 20 V.D.C. motor is preferentially used to provide excellent speed and torque performance, although other motors could be used interchangeably. The encoder is used to monitor motor speed and to derive an indication of output shaft position during operation. This sensor eliminates the need for limit switches on the actuator shaft and makes installation and setup of the motor operator much more precise and convenient (see below). For the encoder (210), we use a zero-speed Hall-Effect quadrature speed sensor, although many other speed sensors (or other digital encoders such as optical encoders) could be used. The sensor counts teeth on a 32-tooth gear (208) mounted on the motor shaft. In this document, the device is referred to as a digital shaft encoder or "encoder".

The drive train (101, 102, 201) is preferably sized and ratioed so as to provide substantial mechanical advantage, momentum and torque. In this way, the effects of variations in switch construction that effect friction, momentum, etc. become relatively insignificant factors in determining actuator-switch acceleration/deceleration.

The high-current assembly (103, and FIG. 3) contains all of the DC circuitry to handle the heavy current requirements of the motor. The motor is turned on/off, forward/reverse through two single-pole, double-throw, high-current motor contactors (301, 302). The contactors preferentially are wired and designed to implement a concept known in the industry as dynamic braking. The contactors are wired in such a way as to short the power to the motor (connect the two motor connections to each other) when the motor is turned off. This causes the motor to come to a stop much more rapidly than if it was simply allowed to spin-down. The dynamic braking method does not suffer from the effects of wear, as a mechanical brake would. Dynamic braking also preferentially eliminates the need for a costly and unreliable electromechanical braking mechanism. Unlike typical motor operators, the motor is preferentially turned on and off under software control of the microcontroller rather than through electromechanical means. This allows the software to take corrective action in the case of an incomplete operation and to make more meaningful indications in the case of a disengaged operator.

The high-current assembly (103, and FIG. 3) also contains a high-current resistor wired in series with the motor (303). Two high-current relays (contactors) control its function (304, 305). One relay (bypass, 304) allows the element to be bypassed for normal, high-speed motor operation. In this mode, the motor produces its maximum torque and speed. A second relay (test, 305) allows the battery to be shorted through the resistor for use in testing the current-carrying capacity of the battery in real time. With the normally-open bypass switched off, and the test relay switched on, a battery test can be performed. With the bypass switched off and the test resistor switched off, the motor operates with the resistor acting as a current-limiting element. This limits the maximum available torque of the motor to a well-defined value and is used by the control logic for torque-limited operations. This resistor can be field-replaced to modify the maximum available torque settings for different switches. Alternatively, a multi-tap resistor can be used which is field-adjustable to yield different values of stall torque and battery test load.

Although in the preferred embodiment, a load resistor is used to limit speed and torque of the motor operator, alternatively, and without departing from the scope of the invention, high-current, solid-state switching devices and pulse-width modulation could be used. Choice of the relay versus solid-state devices is a function of cost and performance requirements of the specific application.

The high-current assembly (103, and FIG. 3) houses a sensing means used to monitor 24 VDC current draw (308). Normally, the measured current is less than a few amps unless the motor is turned on or a battery test is in progress. Current is preferentially measured with a "current shunt", a high-current, resistive element with a low-voltage output proportional to current flow. Measurement of current in real-time by the control computer (104) preferentially allows the software and end user to take corrective action prior to equipment damage or tripping of backup motor current protection (see below).

The high-current assembly (103, and FIG. 3) includes a traditional electromechanical circuit breaker/switch (306) to provide backup protection for the electronics in the case of catastrophic failure or wiring problems, as well as to provide a convenient means to disconnect system power. Activation of the high-current contactor solenoids (309) is via pilot relays on the power conditioning board (105 and FIG. 4).

The power conditioning Circuit board (105 and FIG. 4) handles many of the power management and housekeeping functions of the system plus sensor conditioning (405) and pilot/low voltage output isolation (402). The board has a 24-VDC battery voltage sensor, which is used to monitor the battery voltage rapidly in real-time during switch operation, and is also used in conjunction with the battery test and monitoring system. The board (105) also contains a battery charger (401) which can be controlled by the microcontroller (104). Charging can be turned off during battery testing. At the appropriate point in time, the microcontroller can shut down power to the whole system, preventing over-discharge of the battery and allowing more meaningful feedback to a remote, human operator or automatic control system. A sophisticated battery test methodology is employed to ensure that adequate power is available for the M1 and is discussed further below.

The Power Conditioning Circuit Board (105 and FIG. 4) contains conditioning circuits and a multiplexed analog to digital converter (A/D) (405) for other sensors used by the control computer. A board-mounted cabinet temperature sensor and conditioning circuit is used to monitor conditions related to the battery system and to turn on/off the cabinet heater (403) under control of the microcontroller. A conditioning circuit is provided for an outside air temperature sensor that can be used to detect potential icing and condensation conditions. AC line voltage is monitored using a true RMS sensing circuit. Since the control is supplied from the overhead distribution lines, this sensor can provide useful information about the distribution system and also can be used in automatic distribution line sectionalizing applications. The Power Conditioning Circuit Board also contains a conditioning circuit (407) for a proximity sensor connected to a mounting bracket that normally houses a manual control handle. This handle allows the switch to be decoupled from the motor operator and opened or closed manually. If the handle is not in its bracket, the control software prevents the motor from being operated (see below).

The Power Conditioning Circuit Board (105 and FIG. 4) also contains an interface circuit (406) for the digital shaft encoder mounted on the motor. The interfacing circuitry for this sensor is well known in the industry, with a broad class of products available for this purpose. The interface circuit converts the signals from the encoder into two crucial pieces of information: an interrupt pulse every time a gear tooth passes the encoder, and a separate signal to indicate the direction of shaft movement. The processed data from the shaft encoder is stored in a special area of BBRAM that is retained during replacement of any other system data or software component in memory (see below).

The Power Conditioning Circuit Board interfaces to the Front Panel Microprocessor Board via a parallel, multiplexed bus (404) which allows the cabling to be simpler and more reliable.

As an option, the control can be provided with an accommodation for radio or fiber-optic-connected faulted circuit indicators (109). These are commonly available products consisting of current sensors mounted on each individual distribution current-carrying line. The sensors monitor phase current and transmit a digital signal to the control when current over a pre-selected magnitude is sensed. The control provides three separate digital inputs (407) on the Power Conditioning Circuit Board, one per phase, for this purpose, plus a radio receiver and antenna (109). The fault signal is displayed on the front panel, transmitted over remote communications, and can be used in local control logic for automated functions.

A 24 VDC battery (106, 207, 307) supplies the high-current, stored energy to drive the motor and also provides backup power to the system when AC is not present. We preferentially use two 12 VDC 33 amp-hour lead-acid batteries connected in series, although many other similar batteries could be used.

Figure 6A:
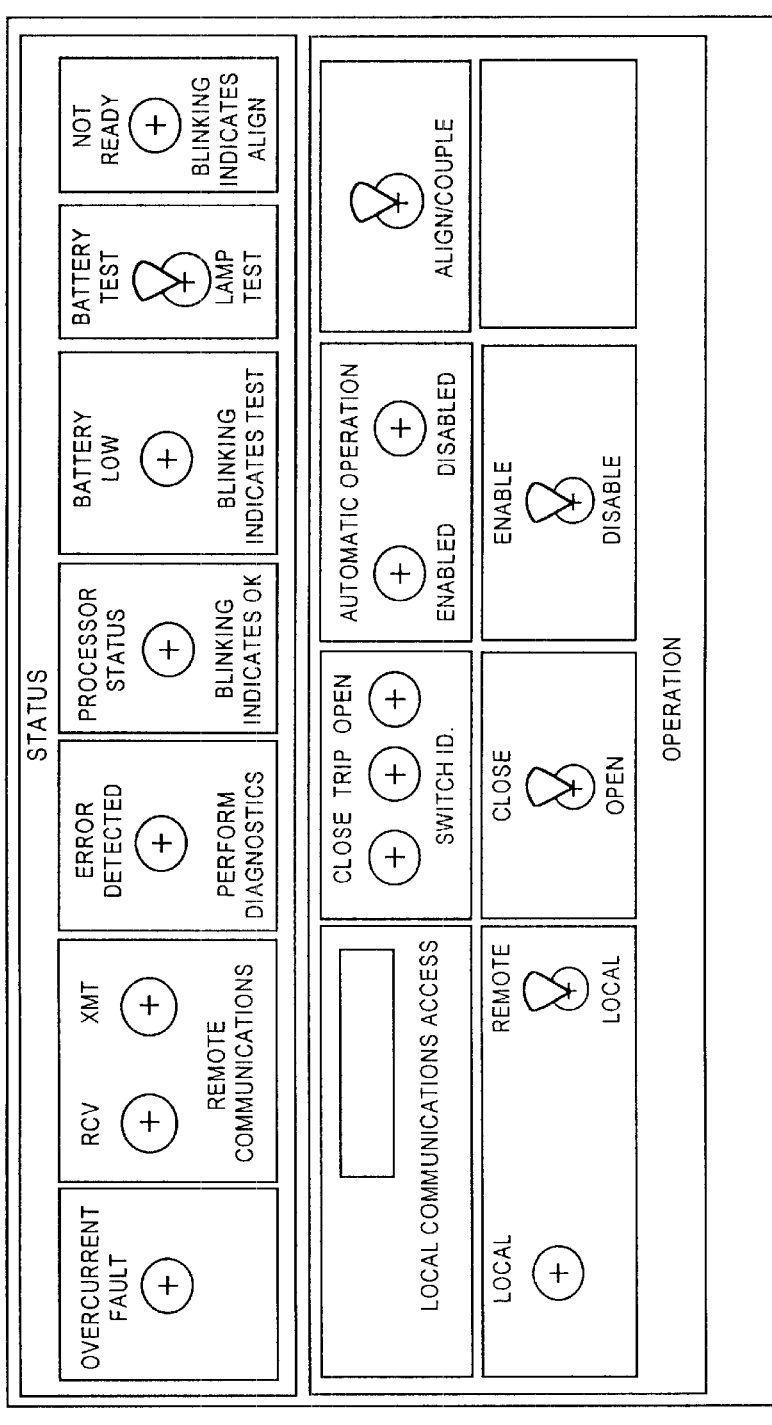

The Front Panel/Microcontroller Board (104 and FIG. 5) manages the operation of the system and allows control and monitoring functions from the front panel (501 and FIGS. 6a and b). The control is based upon an Intel, 80C251-series microcontroller (504), although many other microcontrollers or microcontrollers of comparable speed could be applied equally well. The microcontroller contains nonvolatile storage for data in the form of battery-backed RAM (BBRAM) (506) and for the program in the form of flash EEPROM (FLASH) (503). It also contains a calendar clock (505) used for providing a time and date associated with long term data storage.

The Front Panel/Microcontroller Board (104 and FIG. 5) contains the digital interface for a proximity sensor attached to the cabinet door. This is a valuable indication for warning the remote operator of a possible tampering or security problem at the site. When the door is closed, the control logic turns off all of the power-consuming LEDs.

Local interaction with the Microcontroller is facilitated by a serial RS232C interface (108, 502) and a user interface software package referred to as the "Setup Software". This software allows a local user to examine or change setup parameters in the control, to monitor real-time data, troubleshooting data and event-driven or long-term data storage. The serial interface hardware is via a front-panel-mounted 9-pin RS232C connector. Alternatively, a factory option allows the serial line to be carried outside the control enclosure via an industry standard optic coupler port and interface circuit (502). We use an enclosure-mounted coupler port of the type commonly available in the industry, and the interface circuitry is well known to those skilled in the art.

The microcontroller software architecture consists of an assembly language real-time kernel and application programming environment based around a subset of the "C" programming language. Those skilled in the art will recognize that there are many commercially available tool sets that could be used equally well for developing similar embedded real-time microcontroller applications. Both the BBRAM (506) and the FLASH (503) are segmented into portions that contain the real-time kernel and other "permanent or semi-permanent" data, and the application program and data that are more transient in nature. Components of the system such as application programs and application data can each be individually replaced without requiring a complete reload of the entire memory.

The executable software is partitioned into modules related to hardware interrupt levels and sources. Of particular interest to this application are the following modules:

1) Application program tasks. These are low-priority functions gathered together into a single module. Each task can be scheduled to run in units of 0.1 seconds, seconds, minutes or hours.
2) Timer interrupt. This interrupt executes once every 6.25 ms to handle time-critical application-related events. 6.25 ms is a convenient number, with precisely 16 interrupts every 0.1 seconds.
3) "Application" communication interrupt. This interrupt becomes active whenever data associated with external communication protocols (SCADA protocols) is exchanged.
4) "Maintenance Port" (502) communication interrupt. This interrupt becomes active whenever data is exchanged with a locally-connected P.C. for configuration, setup and troubleshooting/monitoring of the system.
5) A/D sensor acquisition. This interrupt happens on a user-selectable interval to sample each of up to a user-selectable number of analog inputs.
6) External (shaft encoder) interrupt. This is used for counting gear teeth on the gear mounted on the motor shaft.

The application program performs many functions well known to those skilled in the art of producing control computers that are or emulate Remote Terminal Units (RTUs), including the handling of communication (Sensory Control and Data Aquisition or "SCADA") protocols well known in the industry such as DNP 3.0, PG&E Protocol, etc. It also handles many housekeeping functions such as handling front panel commands and LED indications, managing logs of operating data, troubleshooting and diagnostics, etc. The implementation of the methods of this invention are the primary focus of what is described here.

To support the SCADA communication functions, the Front Panel/Microcontroller Board contains a dual UART (DUART), (507) that allows up to two channels of simultaneous asynchronous serial communications at up to 38.6 KBAUD. These channels are wired to the external communications hardware interface (107).

The Communications Interface (107), consists of a standard mounting bracket for a radio, modem or other device, plus the necessary power connectors, cables and components necessary to convert the digital data stream flowing to/from the microcontroller into the necessary form for communication with the external world. This is typically a human operator located at a power substation or control center, or alternatively may be an automatic control system.

Control System Overview

The invention can best be described as a way to replace an imprecise, restrictive electromechanical control system with an intelligent, microcontroller-based design incorporating the speed and torque of a powerful motor and gearbox combination with the common-sense features of a human operator. This involves several general concepts employed throughout the design:

1. Torque control utilizing switchable resistive elements is used to provide varying levels of speed and force to the actuator output shaft.
2. The control methodology distinguishes between the operation to open the switch (OPEN), and the operation to close it (CLOSE). OPEN begins with the actuator moving in the CLOSE direction to determine if the operator is decoupled, followed by a high-torque OPEN operation to move the contacts free of their mating surfaces as quickly as possible to extinguish arcing that would be caused by the switch opening when energized. CLOSE begins with a low torque operation which will prevent damage to the control arms in the unlikely case that ice has caused one but not all of the arms to be somehow stuck to the switch body. After a brief delay, the control switches to high torque mode, generating higher speed and torque as the blades approach their mating surfaces. The operation terminates at a stopping end point with the switch contacts closed and under tension.
3. Motor startup, normal and overload shutdown under microcontroller control to facilitate automatic recovery from failure conditions and to provide additional information to remote human operators or control systems for corrective action.
4. Precise Battery Monitoring and Power Management to ensure that the M1 will deliver the specified torque and speed, to maximize battery carryover, provide valuable remote indications of battery condition, and provide orderly shutdown at end of discharge.

Detailed Description of Operation

Figure 7A:
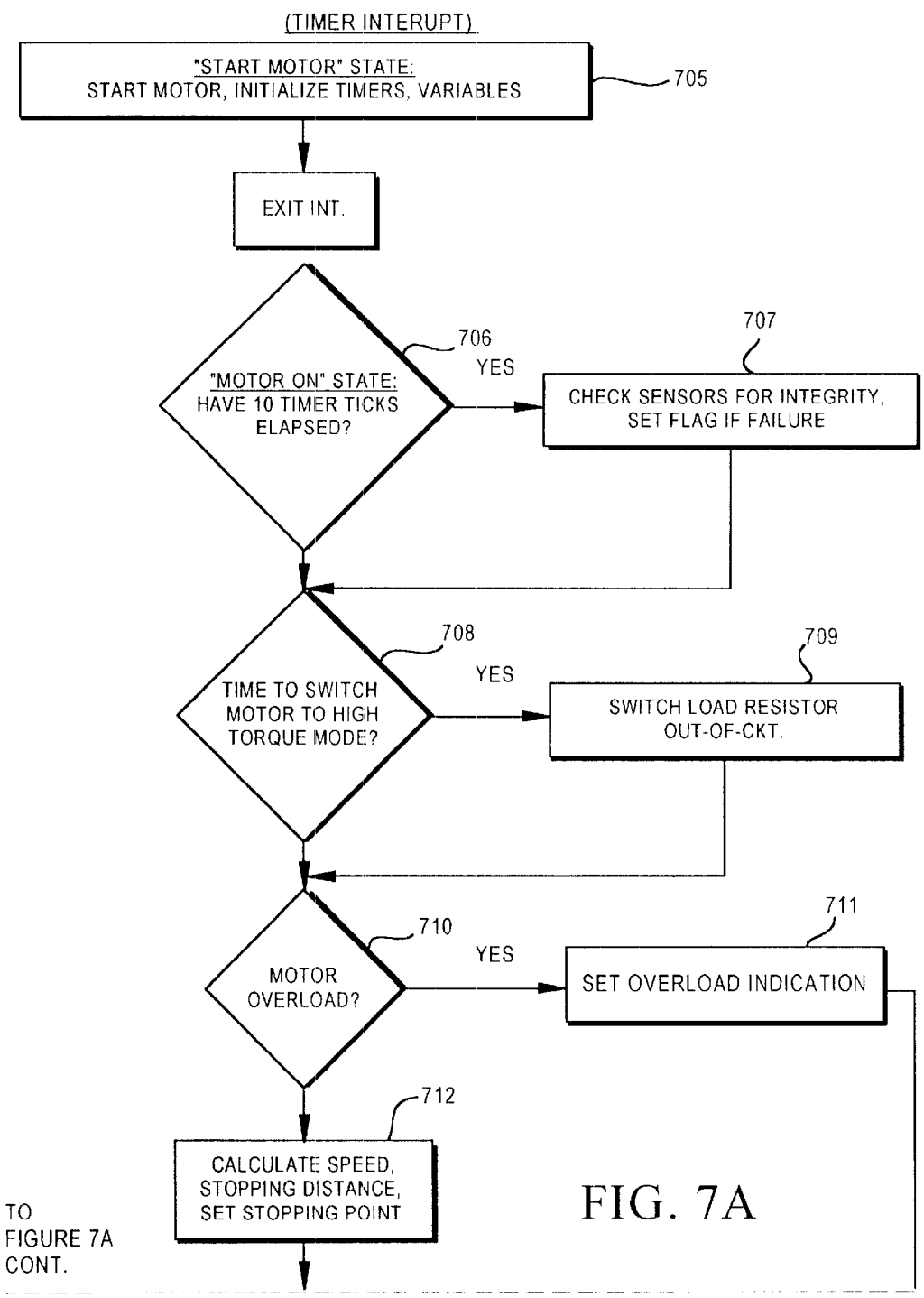
FIGS. 7a and 7b are flow charts of the timer interrupt of the programmed operation of the motor operator of FIG. 1.
Figure 7A:
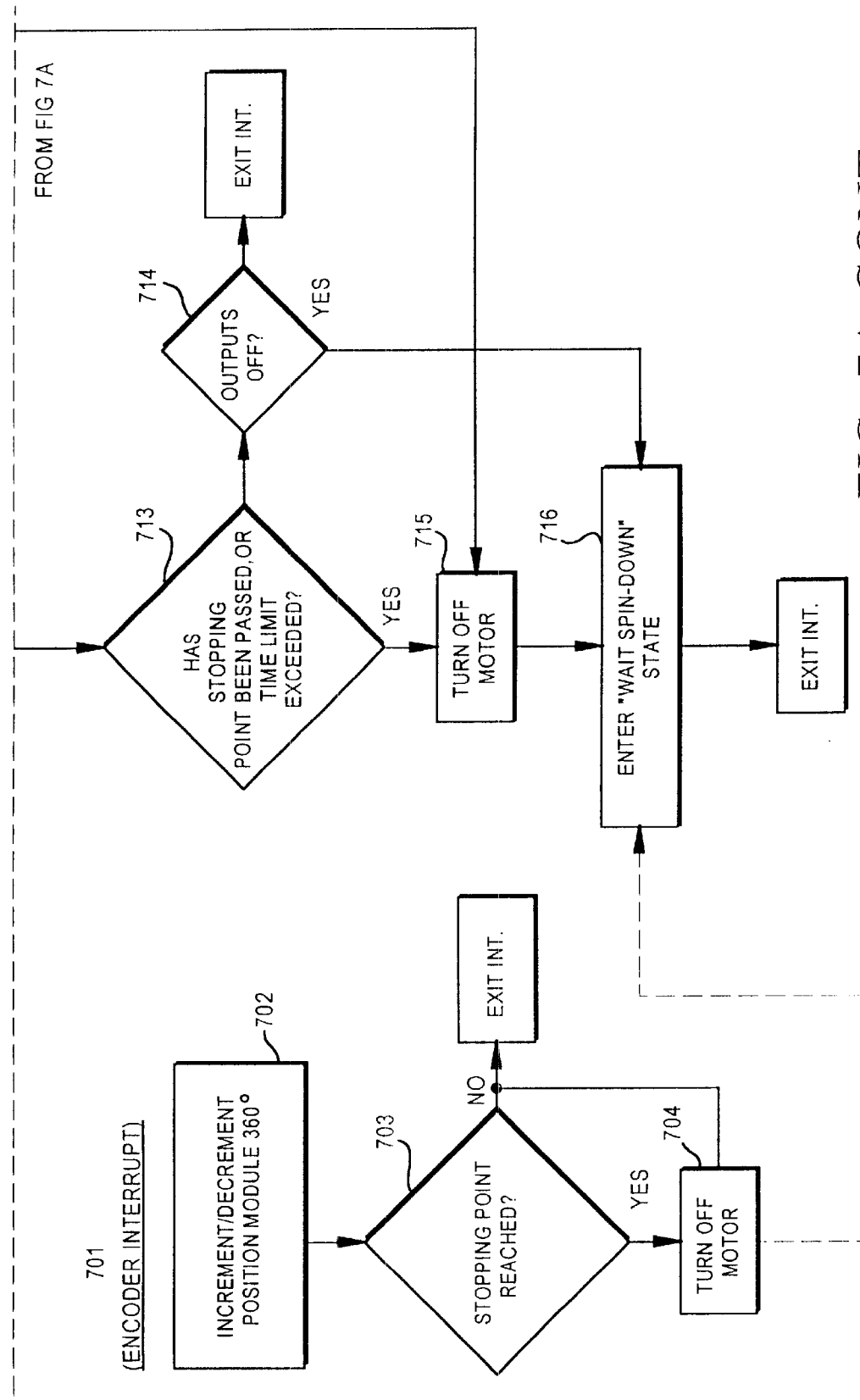
Figure 7B:
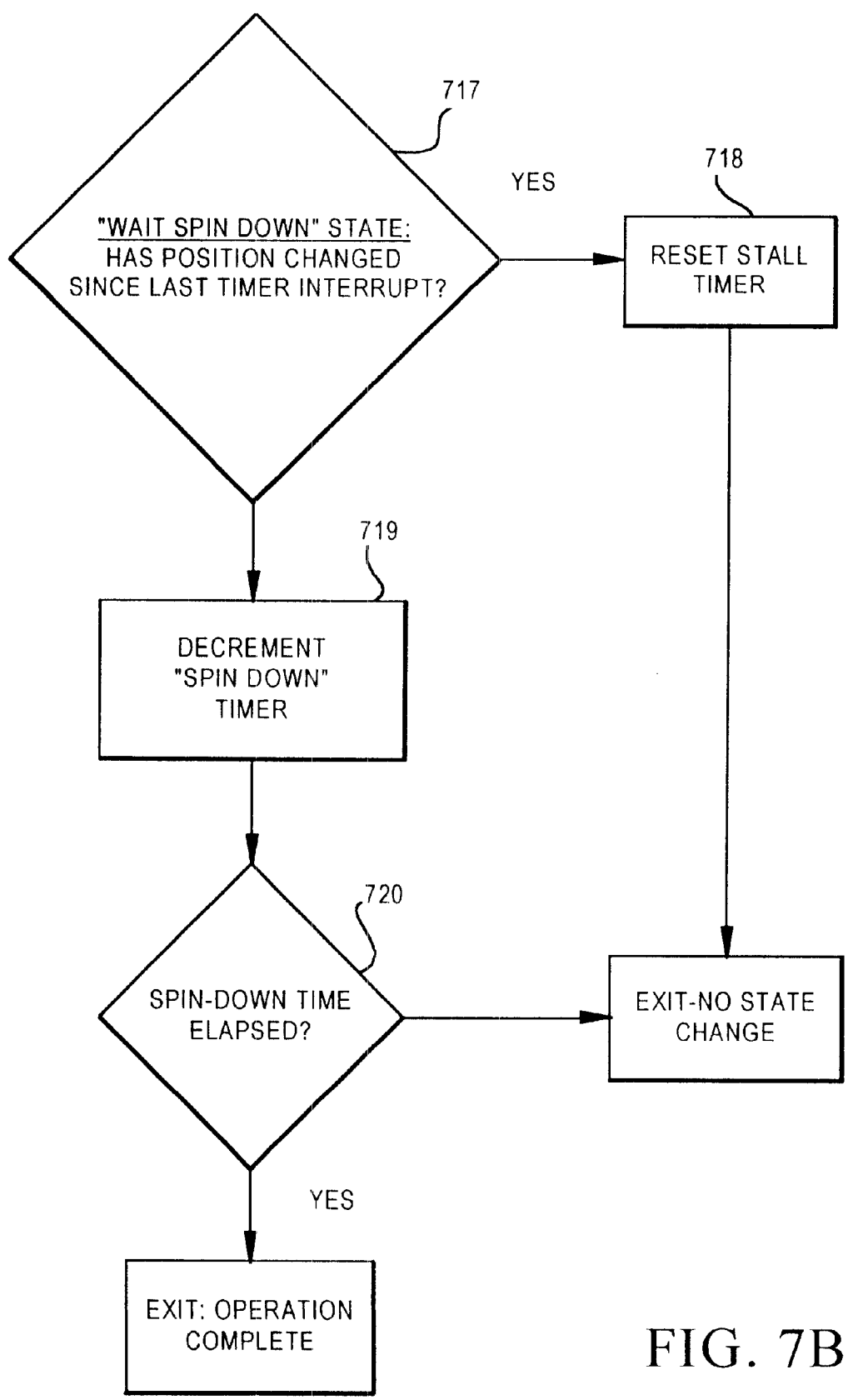
Figure 8:
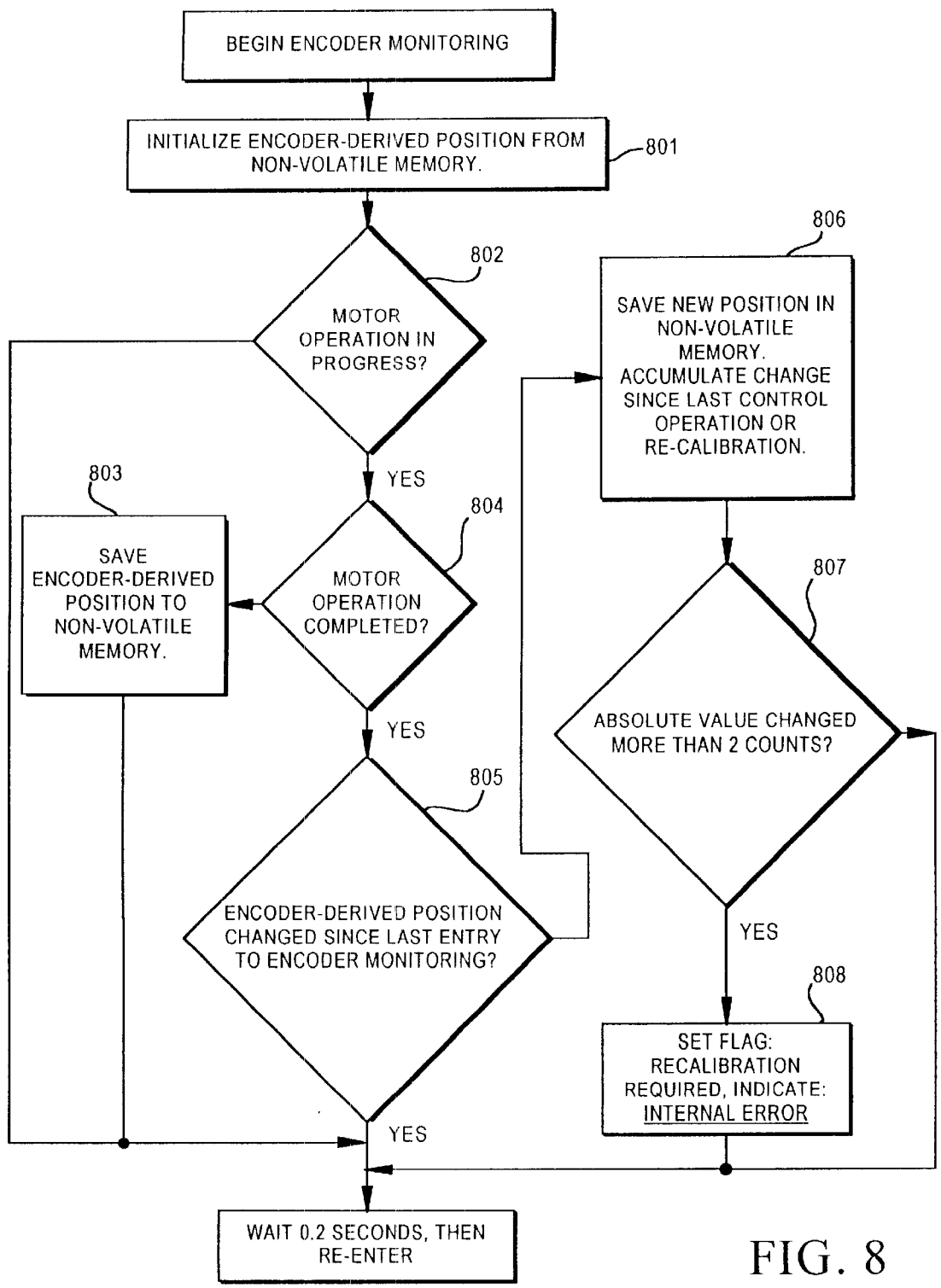
FIG. 8 is a flow chart of the encoder position signal monitoring of the programmed operation of the motor operator of FIG. 1.

The M1 motor operator is fully under control of the microcontroller at all times. Before describing normal operation of the M1, however, it is important to understand some of the key interrupt and application-driven service functions performed in the background. These are shown in FIGS. 7a, b and 8. In these figures, the applicable interrupt is shown above the relevant logic underlined and in parentheses. The timer interrupt is state-driven. Each individual state is dictated by the value of a variable on entry to the interrupt, and the interrupt adjusts the state as necessary when transitions are required. The names of each state are shown as headings inside flowchart components, underlined and labeled as "States".

With regard to the operation sequence flowcharts and text, specific operation sequence names are all upper case characters. Mixed case underlined terms labeled "Indications" are significant software flags.

External Interrupt

Referring to FIG. 7a, the external interrupt (Encoder Interrupt) (701) happens whenever the encoder sensor detects movement of a gear tooth past the sensor. The gear is mounted on the motor drive shaft (206). A separate digital input is sensed by the interrupt to determine the direction of movement. During each interrupt, one and only one count is either added or subtracted from the stored position (modulo the number of teeth per full revolution of the output shaft) based upon the sensed direction of movement (702). We preferentially use a 32 tooth gear and a 60:1 ratio gearbox. Thus, (assuming that there are no failures of the linkage between the motor and the output actuator through the bevel gear assembly or gearbox) each tooth represents precisely 0.1875 degrees of output shaft movement, although many other combinations of teeth and gearbox ratios could be used. This allows a derivation of actuator position and speed limited only by the resolution of the number of teeth on the encoder-monitored gear. This has the advantage of enabling very accurate position calculations in a low cost product, but has the disadvantage of requiring substantial processing to convert motion in units of single gear teeth on the motor, plus direction of travel, into a derivation of absolute actuator position.

The position monitoring logic also requires that all motion be monitored with the system powered-up, and that the position be remembered during power-down. To ensure that this is the case, the motor's shaft is covered as necessary to prevent external, manual rotation.

Shows the process used to maintain knowledge of the output actuator position. At power-up, the initial position of the encoder is read from non-volatile memory (801). Encoder position is periodically monitored for changes (initially captured and aggregated by the external interrupt). During motor operation, the monitoring is suspended (802). After the control operation, the updated encoder-derived output shaft position is saved in non-volatile memory (803, 804). In addition, whenever a change in the derived position is detected that is not due to a motor-driven control operation (805, 806), the new value is saved again in non-volatile memory and the change is accumulated. If the absolute encoder position changes by more than 2 counts, an error is indicated that requires the user to inspect and recalibrate the operator (808).

The encoder interrupt (701) also provides the important capability to turn off the motor precisely when a desired actuator position, ie., "stopping begin point" is reached (703, 704). With 0.1875 degree accuracy, the motor can be turned off, allowing the entire switch assembly to come to a stop at a very precise and reproducible point, ie., "stopping end point". If the motor is turned off by the external interrupt, this is detected by the timer interrupt which inspects the outputs to see if they have been turned off (714). This signals the timer interrupt to do a state transition to the "Wait Spin-Down" state (716).

Timer Interrupt

Referring again to FIG. 7a, the Timer Interrupt determines if a command has been requested by the application program ("Start Motor" State, 705). Four commands are supported and intercepted by the "Start Motor" State: OPEN, CLOSE, JOG OPEN and JOG CLOSE. OPEN and CLOSE begin a sequence of state transitions that manage the operation as described below, corresponding to moving the actuator in the CLOSE or OPEN direction to a point of completion.

In addition to the command processing, the timer interrupt stores data during high speed operations that may assist in troubleshooting problems. This data includes speed, encoder position, motor current, battery voltage, and processing state. The only difference between the OPEN and CLOSE operations, and their JOG counterparts, is that the JOG variants do not log data during operation. This is because the JOG variants are used to move the operator only short distances and can't create the problems associated with fast, high-torque operations.

Timer Interrupt—"Start Motor" State

The "Start Motor" State waits for a command to be requested, turns on the motor and initializes variables and timer counters (705), then transitions to the next state. The motor turns in one of two directions. The assignment of the motor control outputs to OPEN and CLOSED can be reversed by a user-specified configuration option passed to the "Start Motor" state of the timer interrupt.

Timer Interrupt—"Motor On" State

The "Motor On" state (706) handles the decision making for turning off the motor. Each operation managed by the state continues until one of three conditions is reached:

1) The desired position of the actuator is at or beyond a point in time when the motor should be turned off has been reached (713). This condition is also sensed by the external interrupt (above) and the timer interrupt synchronizes to the external interrupt by watching to see if the motor outputs have been turned off by an external process (714).
2) Motor overload has persisted for more than a predefined time interval (710). Motor overload is preferably calculated by determining the effective impedance of the motor based on measured supply voltage and motor current at each timer interrupt. (Alternatively it could be based only on either battery voltage drop or motor current). We divide the voltage by current to get impedance, then average the most recent 8 samples (50 milliseconds of data). If the average effective impedance is less than twice the motor's locked-rotor, short circuit impedance for greater than 100 milliseconds, we turn off the motor (711, 715) to retain software control of the M1 system. Note that there are many possible criteria that can be used for this decision making. Note also that this logic must be coordinated with the backup circuit breaker to prevent the backup circuit breaker from tripping due to expected, occasional high current due to motor overload, while allowing the circuit breaker to protect the electronic components from catastrophic failure.
3) A predefined time limit has been reached (713). This limit is often triggered by the JOG commands which are used for short actuator travel. Otherwise this limit should never be met in practice, unless the position encoder fails during the operation.

Shortly after the "Motor On" state has begun (10 ticks or 62.5 ms in the preferred embodiment), the interrupt checks the sensors for internal consistency and raises the "Internal Error" flag if problems are detected (706, 707). In the preferred embodiment, the following tests are made:

1) The encoder should have begun counting (position change>0)
2) Current over 25 amps should be present
3) Battery voltage should be over 12 VDC.

If these indications are raised, operation continues but only to the end of the current operation.

During CLOSE operations, the operation begins with the load resistor switched in for a brief period of time. This prevents over-stressing the switch if ice prevents the shaft from moving. By waiting until the predetermined time limit is reached before switching the load resistor out of circuit, the actuator shaft is stopped and tensioned when the motor is switched into high torque mode. This limits the force applied to the switch. The timer interrupt energizes the bypass relay (709) when the timer expires (708).

Stopping Distance Calculations

In addition to monitoring the above conditions, the "Motor On" State also calculates average motor speed over the last 25 milliseconds (712) and updates a "stopping begin point" (used also by the external interrupt) dynamically by looking up operator stopping distance in a table. "Stopping begin point" is the derived actuator shaft position at the precise point in time where the motor (or other driving force) should be turned off in order to allow the switch control rod to reach the desired end point of travel and torque, that is with the switch under tension, in a single operation of the motor. The "stopping begin point" is derived by subtracting "stopping distance" from the desired "stopping end point" to yield a position where the motor should be turned off. We calculate the table entries (see below) prior to switch operation based upon an electromechanical model of the entire M1-switch system, but these can also be measured experimentally and/or calculated during switch operation.

The dynamic calculation of stopping distance is an important aspect of the invention and yields a very reliable, battery voltage-independent or speed-independent means to reach a precise stopping end point. In the preferred embodiment, the calculation ignores the small, insignificant mass of the switch, control rod and linkages relative to the motor armature and gearbox gears, although terms for mechanically modeling the switch could easily be added. The spring constant of the control rod is used in the calculations, and we provide the means for the software to calculate the spring constant based upon user entry of the type and length of the control rod or by entering the control rod's spring constant directly. In addition, terms are included for an aggregate spring constant of the switch mechanism which typically has a negligible effect on stopping distance (as shown below).

The stopping distance is calculated according to the formula below. In the preferred embodiment, the formula calculates stopping distance as a function of three terms: a fixed, control system delay, the stopping distance of the motor and gearbox independent of output loading or feedback (unloaded), and the decrease in stopping distance associated with driving the user-specified switch against its mating contacts to a predefined final torque. In the preferred embodiment, the formula is normalized to yield a result in gear teeth as counted by the encoder, with each tooth representing 0.1875 degrees of movement of the output actuator shaft. Thus the formula is:

$$Dstop = Ddelay + Dbrake - Dforce$$

Where:

Dstop Stopping distance in units of encoder-counted gear teeth

Ddelay Distance traveled by the disengaged motor-gearbox-actuator between the time the control system de-energizes the pilot relay, and the time that the motor wires are shorted. This term is calculated by multiplying speed times the average relay reaction time (27 ms for the preferred embodiment) to yield a result in gear teeth.

Dbrake Distance traveled by the disengaged motor-gearbox-actuator from initial braking (shorting of motor leads) to full stop. For the preferred embodiment this distance is a linear function of initial speed at time of braking and is calculated as 0.43* speed (in units of gear teeth/6.25 ms* 10). For other motor-gearbox-actuator combinations, this distance formula can be determined experimentally or calculated using an electromechanical model.

Dforce Decrease in stopping distance due to the counter force applied to the system by the switch landing on its mating contacts (not applicable to OPEN operation. This term is a function of the desired end torque, mechanics of the motor operator, and the spring constant of the entire motor operator-switch mechanical system.

For pre-packaged systems where the torque and spring constant are fixed, Dforce can be measured by statically adjusting the motor turn-off point until the desired amount of final resting torque is applied to the control rod, then subtracting the measured stopping distance (Dstop) from the measured stopping distance for an uncoupled operator (Ddelay+Dbrake).

For the preferred embodiment (based upon configuration parameters) the final torque setting, switch spring constant, control rod spring constant and control rod length are known, and the following equation is used to calculate Dforce:

$$Dforce = 7 + DFtorque + DFspring$$

where:

DFtorque=(Torque−100)*0.064 (Torque>=100) (or)

DFtorque=−(100−Torque)*0.054 (Torque<=100)

DFspring=−(K−42)/0.038 (K>=42) (or)

DFspring=(42−K)/0.1 (K<=42) and

Torque Actuator shaft torque in ft.-lbs at the desired stopping end point.

K System spring constant in ft-lbs/deg.. K is calculated using the formula:

$$K = 1/(1/Koper + 1/Kswitch + 1/Kshaft)$$

where:

Koper Spring constant of gearbox. This is 111 for the preferred embodiment.

Kswitch Spring constant of swtich. This is switch model dependent. A typical value is 200 but must be provided for each switch.

Kshaft Spring constant for the main control rod. Kshaft is obtained from the formula:

$$Kunit/L \text{ where}$$

Kunit The spring constant of the control rod per unit of length.

L Length of the control rod.

A feature of the invention is it's flexibility in allowing the specification of the parameter "Torque" (described above) as either a design parameter or as an end user-specified parameter. During motor operator calibration (see below), the system applies a predefined amount of torque to the control rod. The actuator position associated with this torque setting is then recorded as a switch "CLOSE" position reference point. Through the application of the formulas described above, the control logic can modify the stopping distance based upon a user-specified value that differs from the calibration torque value.

In the preferred embodiment (as well as in many alternative embodiments utilizing temperature sensitive components), the accuracy of the stopping distance calculation can be improved by including a temperature compensation factor. In particular, the resistance of copper wire changes as a function of temperature. In a component operating over a −40° C.–+70° C. operating range, the deviation is as much as 26% from room temperature behavior. In the preferred embodiment of the motor operator, both the motor operating relays (pilot and high-current motor contactors) and the motor winding itself are affected. However, the two components combined have a partially canceling effect on each other. For example, at low temperature the motor operating relays hold-in longer, causing the braking distance to increase, while the motor brakes better, causing the braking distance to decrease. In the preferred embodiment utilizing a DC permanent magnet motor, the effect of temperature on the braking of the motor is approximately linear, being directly a function of the change in current through the motor winding. Thus, the effect is entirely on the term Dbrake in the equation above, and is calculated as:

$$Dbrake = DbrakeNominal + (DbrakeNominal * 4.27 * 10-3 * (Tmotor-23))$$

Where:

Dbrake Nominal=The uncorrected stopping distance.

Tmotor=The temperature of the motor winding in units of ° C.

In the preferred embodiment, the cabinet contains an internal temperature sensor read by the control system every 6 minutes and saved in a buffer containing the most-recent four hours of temperature readings. Since the temperature of the air in the cabinet changes more rapidly than the temperature of the motor winding, Tmotor is approximated as the four-hour moving average of the 6 minute cabinet temperature samples. For initialization on power-up, the four hour moving average and sampling buffer are initialized to the instantaneous cabinet temperature reading.

The effect of temperature on the motor control relays is more complicated. The distance traveled during the reaction time of the control system (reaction time of the relays), Ddelay is a sum of the distance traveled while waiting for the the coils to release the contacts, plus the distance traveled while waiting for the relay contacts to mechanically swing from the energized to deenergized positions, thus initiating dynamic braking. Only the coil release time is affected by temperature. This is approximated in the preferred embodiment as:

Ddelay=(Trelease+Tswing)*speed And

Trelease=TreleaseNominal−(TreleaseNominal*4.27*10-3*(Tcabinet−23))

Where the additional terms are defined as follows:

Tswing=Average observed time for both the pilot relays and motor contactors to swing from closed to open positions, or 17 ms, expressed in units of 6.25 ms.

TreleaseNominal=Average time for relay coils to release their contacts at room temperature, or 10 ms, expressed in units of 6.25 ms.

speed=The speed of the output actuator, expressed as above in units of encoder counted gear teeth/6.25 ms.

Tcabinet=Instantaneous measurement of cabinet temperature in units of ° C.

The dynamic calculation of stopping begin point may be modified as necessary for other selections of control system components to provide a comparable prediction of stopping distance based upon different braking systems, mechanical drive efficiencies and other static influences as well as dynamically changing factors such as battery voltage.

Timer Interrupt—"Wait Spin-Down" State

The "Wait Spin-Down" state (717) becomes active to monitor motor motion until it comes to a complete stop. During each interrupt, the position change is monitored. If any change is observed since the last interrupt, a 150 ms timer is restarted (718). When the timer counts down to zero (719, 720), the state is exited and this also terminates the overall operation. At this point, the timer interrupt enters an idle state waiting for the next command to be issued (handled by the "Start Motor" state).

Motor Control Command Dispatching

Figure 9:
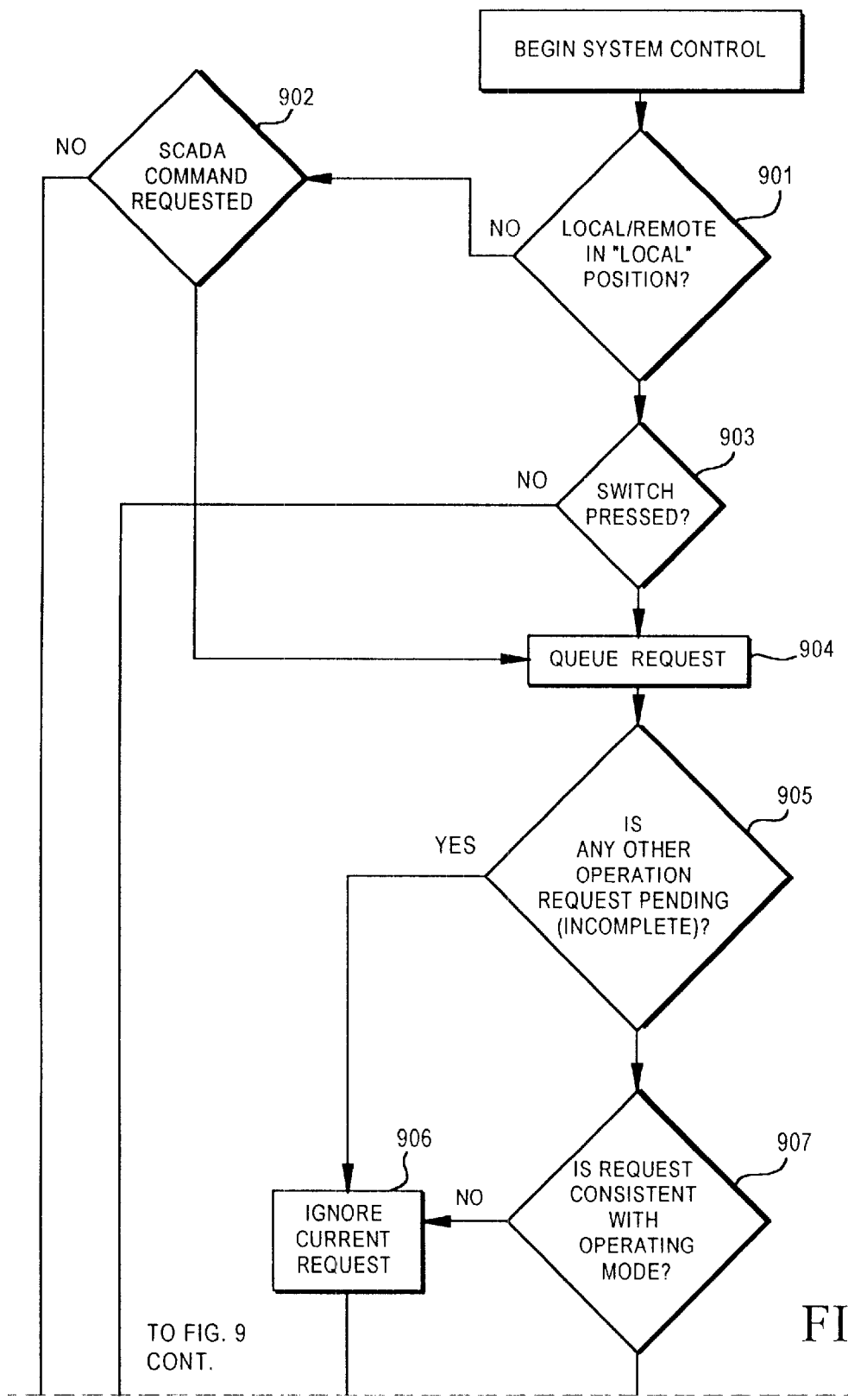
FIG. 9 is a flow chart of the command dispatching modes of the programmed operation.
Figure 9:
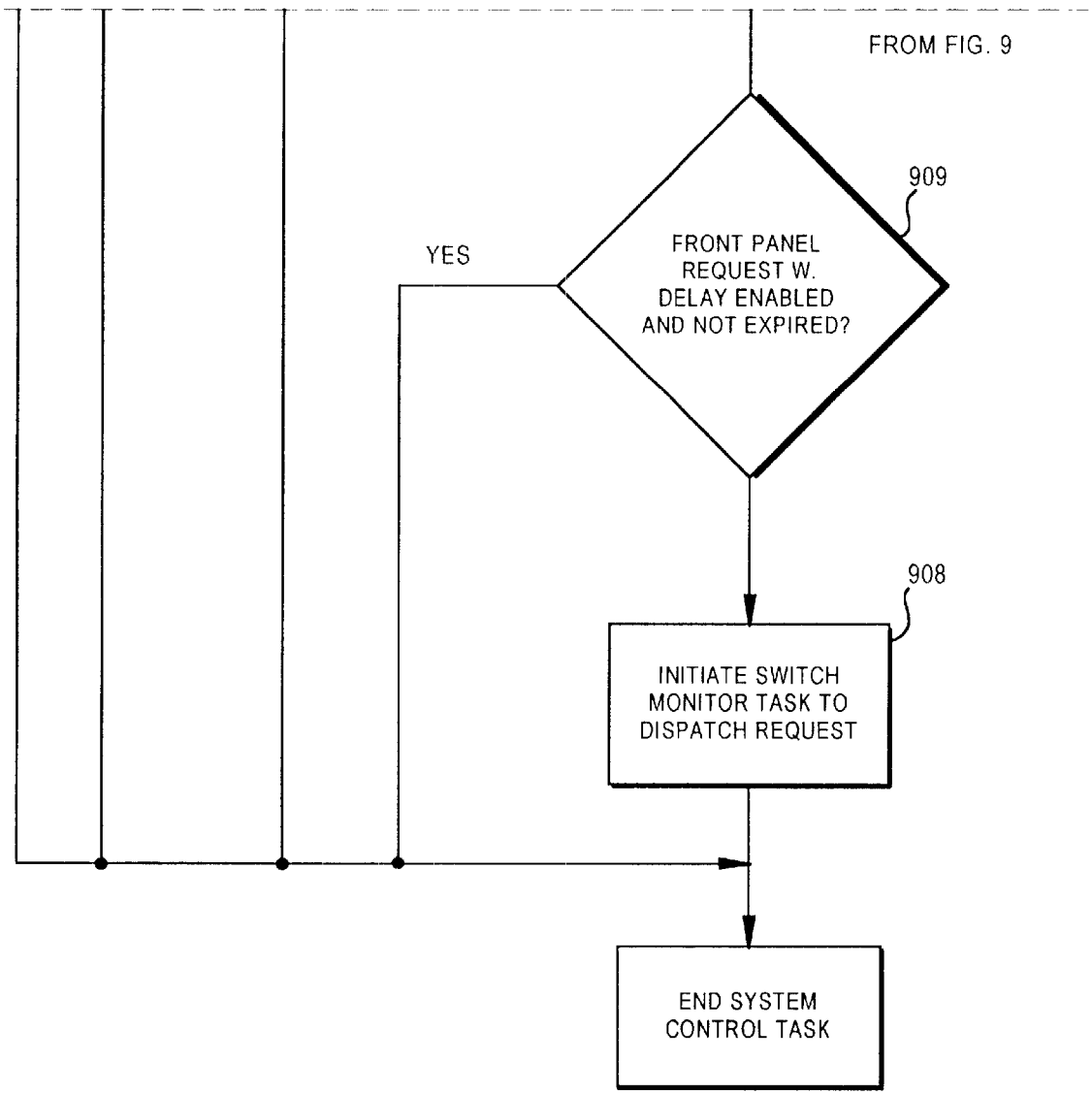

FIG. 9 shows the basic control logic associated with processing commands for motor operator action. There are many well-known, possible implementations of this dispatch process that may be used without deviating from the scope of this invention. The logic allows front panel requests or SCADA (received via remote data communications) requests based upon the position of the "Local/Remote" front panel switch (901, 902, 903). If a previous request is still in progress (905), the new request (904) is ignored. Otherwise the request is checked against consistency with all of the flags and states detailed in the sections below (907), and ignored if inconsistent (906).

A user setup parameter enables a specified delay before normal "OPEN" and "CLOSE" commands entered from the front panel are acted on. At 909, a check is made to see if this option is in effect. If it is, and if the delay timer is not active, the timer is started. At the expiration of the timer, the logic initiates the previously requested command. If the timer is already active, and any switch is pressed on the front panel, the timer is deactivated and the command ignored. This allows the user to cancel a delayed command.

"Switch Monitor Task" is then initiated to handle the detailed processing of the request (908). The system control task then ends, and is rescheduled to run within a few tenths of a second.

Control Sequences Associated with Switch Operation

Figure 10:
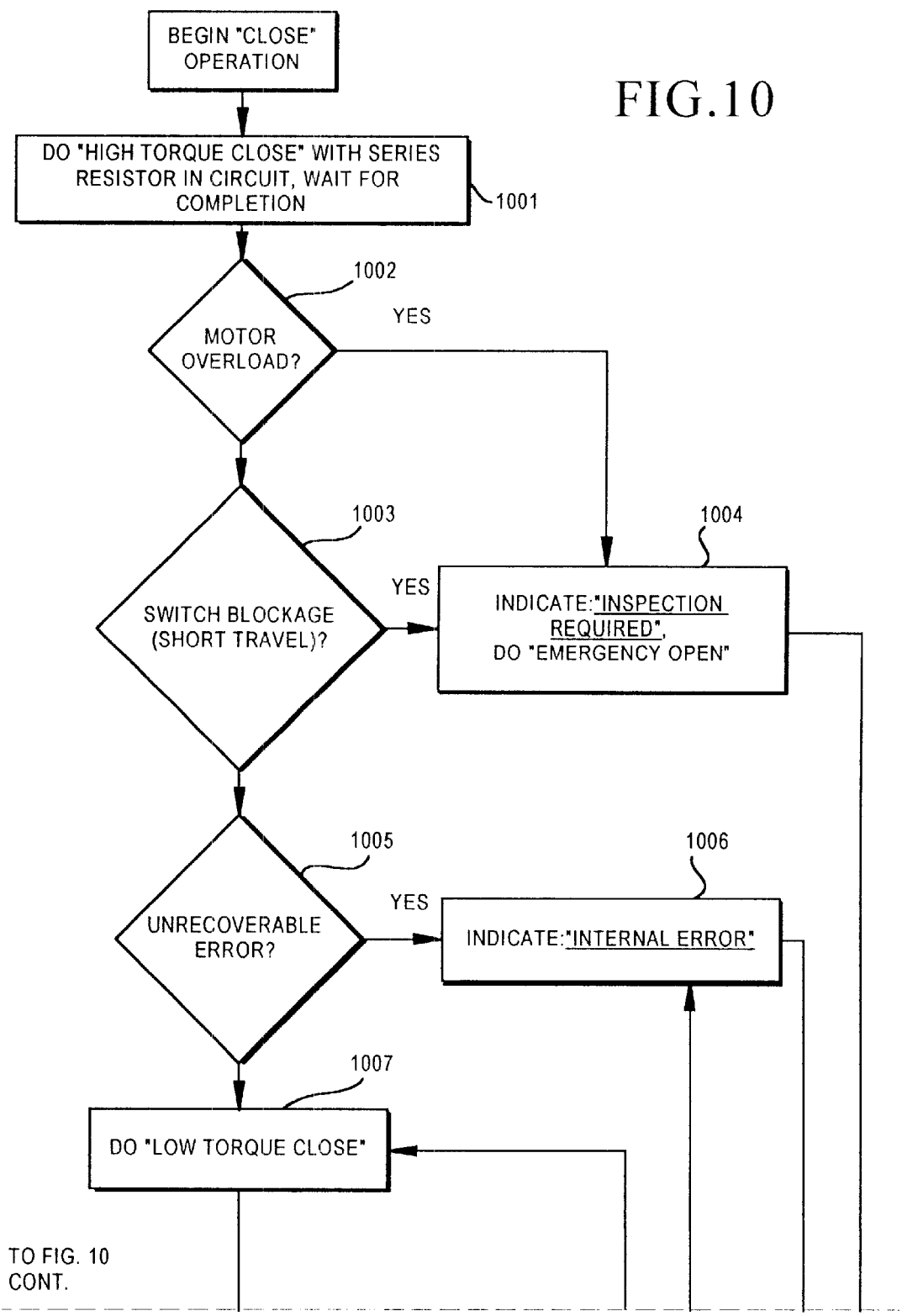
FIG. 10 is a flow chart of the CLOSE mode of the programmed operation.
Figure 10:
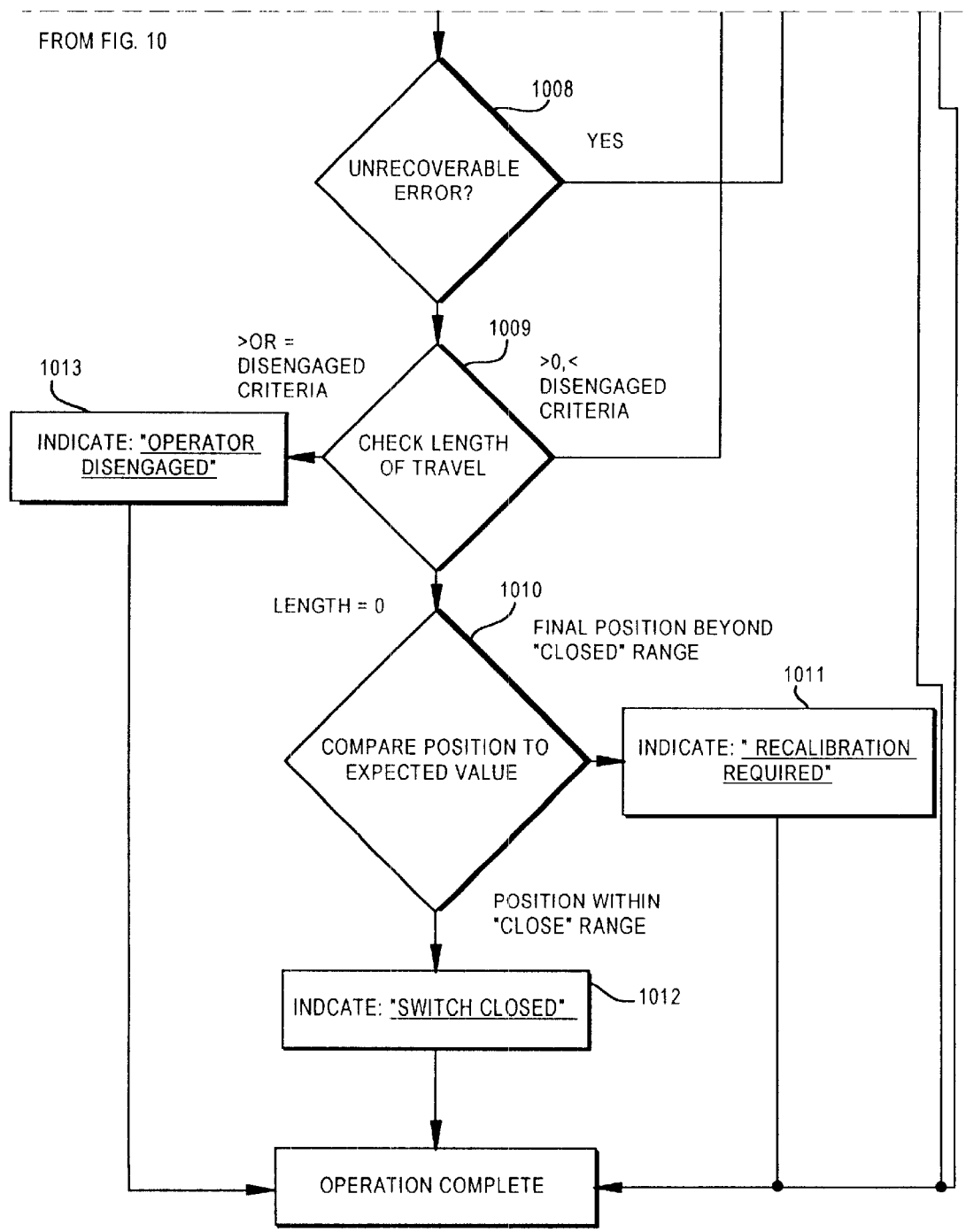
Figure 11:
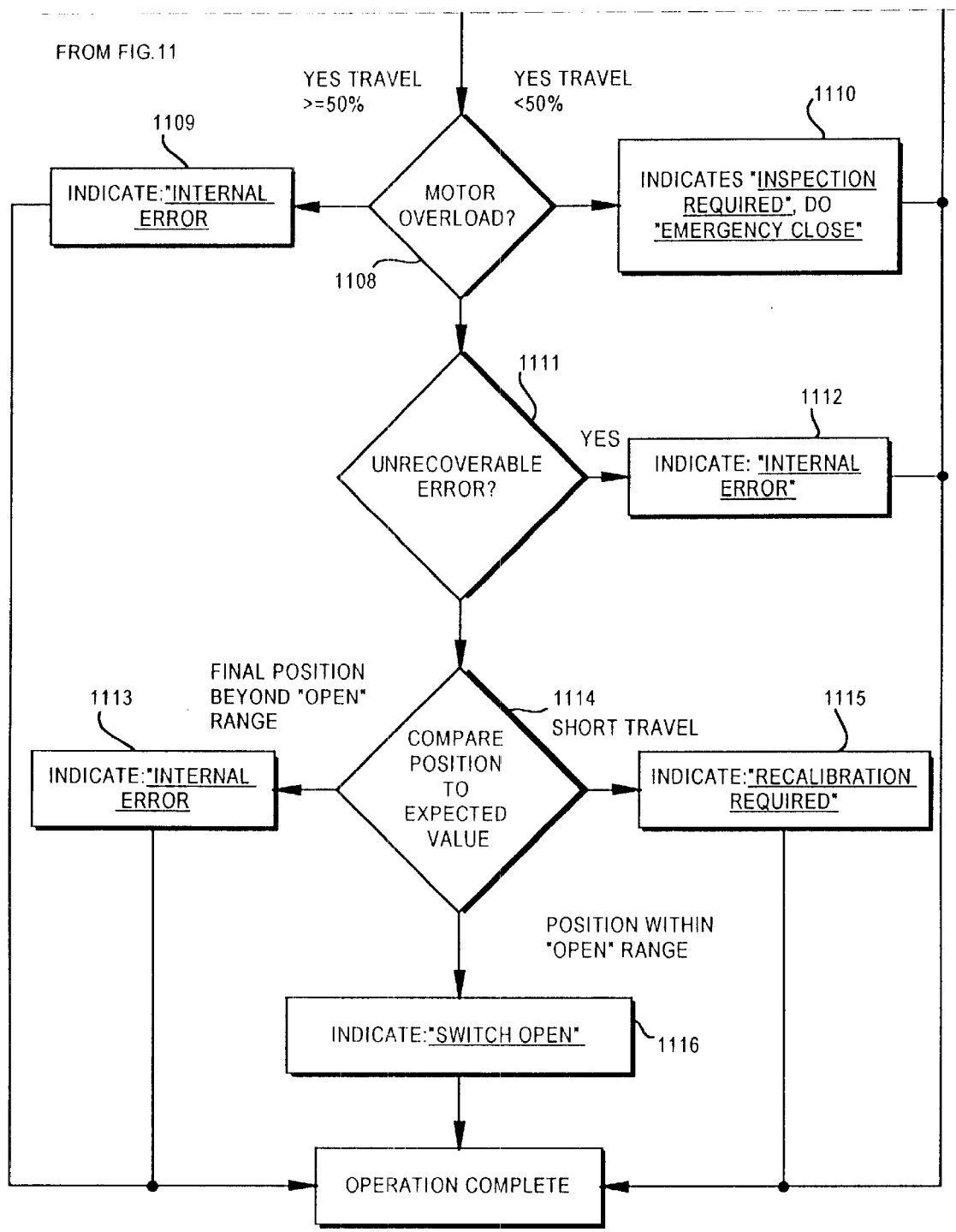
FIG. 11 is a flow chart of the OPEN mode of the programmed operation.
Figure 12:
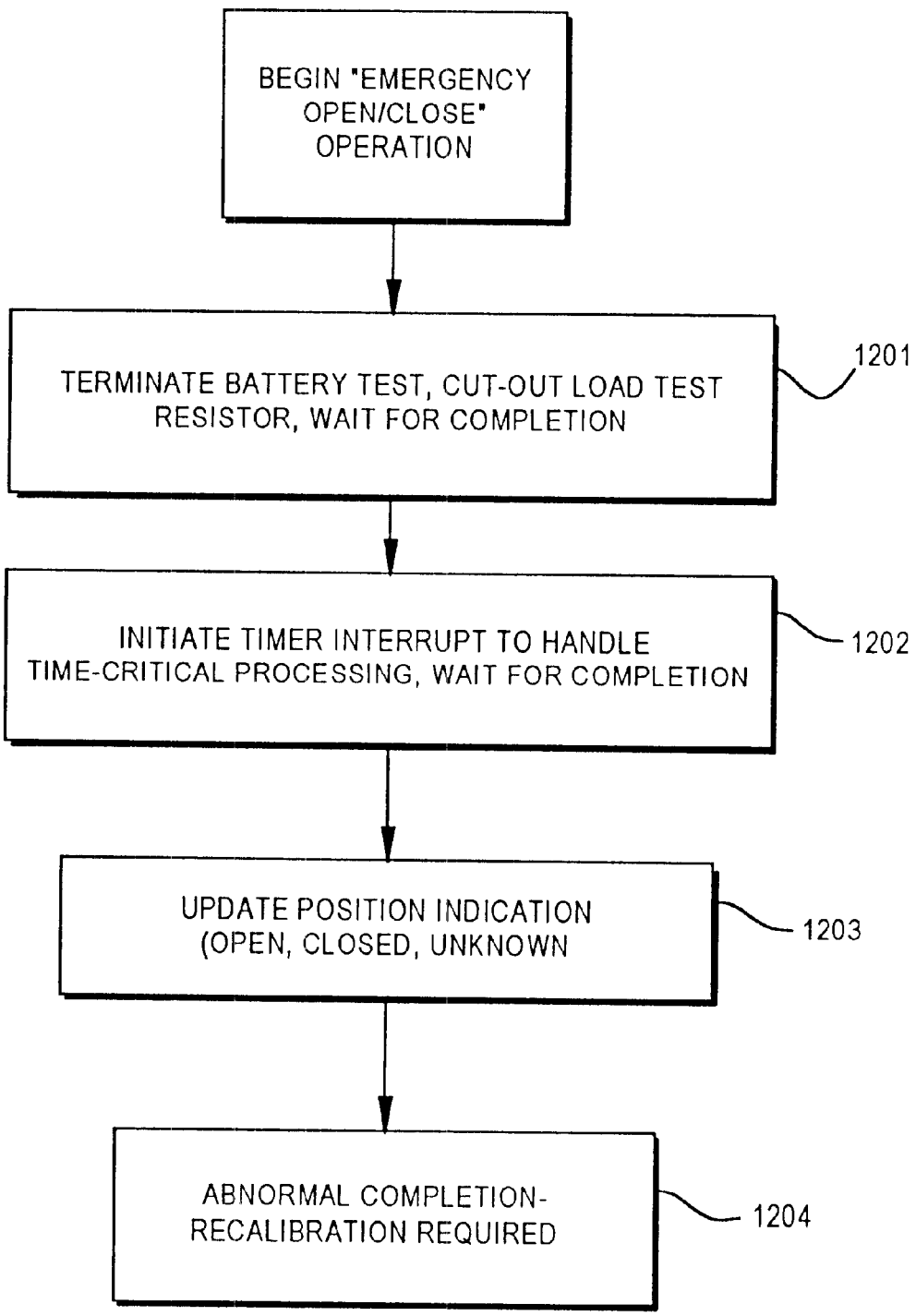
FIG. 12 is a flow chart of the emergency OPEN/CLOSE mode of the programmed operation.

FIGS. 10–12 show the control sequences associated with user-requested switch operations. In addition to the major steps shown in the flowcharts, the control logic performs a number of housekeeping, equipment protection and user interface steps to facilitate proper overall operation. Specific items relevant to the subject of this invention are described below. Other items are common sense steps of error checking well-known to those versed in the art.

There are two general types of actuator movements that are generated by the control logic, each is applicable to both OPEN and CLOSE operations. HIGH TORQUE operations are those intended to move the actuator with both high speed and torque to its fully open or closed resting position. These operations may begin with the series load resistor in-circuit, but always end with the resistor bypassed. LOW TORQUE operations are those that begin and end with the series resistor in circuit. These operations are for making small, incremental movements of the actuator, and are referred to in this document as "JOG" operations. They are used to apply tension to the switch mechanism at the end of a control operation and to move the actuator in small increments when aligning/setting limits of travel. Alternatively, if solid state switching devices are used in lieu of a load resistor, the "JOG" operation could be easily implemented by limiting the available voltage or current to the motor.

Prior to beginning each control sequence, the control verifies that the battery system has adequate power to maintain voltage under worst-case loading requirements (see description of battery system below). The logic also checks to ensure that the front panel Local/Remote switch is in a position consistent with the source of operation. For requests originating via communications, the switch must be in the "Remote" position. For front panel operation, the switch must be in the "Local" position.

Critical to the proper operation of the control system is a multi-level set of error conditions, requiring different forms of corrective action before further operation is allowed. Problems are categorized into the following prioritized levels:

Many of these conditions are discussed in more detail in the applicable sections below on specific operation sequences. The references above to "Emergency" operations should not be confused with the EMERGENCY logic sequences referred to in the flowcharts. The "Emergency" operations are alternate forms of the commands entered from the SCADA master station. These commands are identical to the normal OPEN and CLOSE commands, except that the initial states of the "Motor Overload" and "Internal Error" indications are ignored.

Some indications are of particular importance to the invention. The indication "Inspection Required" is generated whenever the logic determines that there is cause to believe that a mechanical problem such as a welded/stuck contact or ice buildup may have bent, damaged or caused misalignment of the switch. These problems are detected as motor overloads or position sensing anomalies of a specific type, and require physical inspection of the switch. The flag is cleared only by toggling the front panel Local/Remote

| Problem Category | Typical Causes | Visual/Remote Status Indications | Impact/Method of Clearing |
| --- | --- | --- | --- |
| Catastrophic Control Failure | Microcontroller Failure, Memory Failure | "Reset" LED on microcontroller board on | Control Dead/Power Cycle control, probable board replacement. |
| Partial Control Memory Failure | Internal Software Failure/Memory Hardware Problem | No front panel or microcontroller LEDs on, but control has power, indicated on power conditioning board | Control Dead/Reload software, probably board replacement |
| Internal Errors | Sensor Failures, Wiring Problems | "Error" and "Not Ready" LEDs on. Specific problem sets remotely and locally-readable indication | Only "Emergency" operations allowed/ Clear via P.C.-based. Local Setup Software Only |
| Bad Battery | Dead or disconnected battery, extended power outage | "Battery Low" and "Error" LEDs on. | No operations allowed/Clear by correcting problem and requesting software battery test or waiting for automatic test request. |
| Low Battery | Battery deterioration or extended power outage. | "Battery Low" LED on | No impact - strictly warning indication/ Clear by correcting problem and requesting software battery test or waiting for automatic test request. |
| Motor Overload | Switch Blockage (welding, ice, etc.) | "Not Ready" LED on | Only remote "Emergency" operations accepted/Toggle "Local/Remote" switch |
| Operator Disengaged | Switch decoupled from actuator | "Not Ready" LED blinking | Only "Jog" or "Emergency" commands accepted until actuator inside normal range of travel |
| Actuator Travel Erroneous ("Recalibrate") | "Calibration not performed, switch mechanical problem | "Open, Closed and Not Ready" LEDs blinking | Only "Jog" commands accepted/Set/Reset "Limits of Travel" |
| Operating Handle Absent | Handle has been removed | "Not Ready" LED on | No operations allowed locally or via communications until handle has been returned to its bracket. | switch. As with all other indications, the "Inspection Required" indication is held in non-volatile memory which survives extended power outages.

The indication "Internal Error" is generated whenever the logic identifies a problem that strongly suggests a hardware or software malfunction. This indication requires the lineman to clear a flag using the local setup software. In doing so, the operator acknowledges receipt of the indication. For event-driven causes of this indication, clearing the indication allows the switch to resume normal operation. For status-driven causes such as sensor failures, the indication can only be cleared if the problem is corrected.

The indication "Recalibration Required" is generated when the switch's final resting points (travel limits) have been invalidated during operation, or have not been set.

Normal CLOSE Operation

FIG. 10 provides an overview of the sequence of operations associated with closing the switch under normal circumstances. At the beginning of the operation, the logic validates the request against indications identified in the table above, and then begins the control sequence. "HIGH TORQUE CLOSE" is defined by the logic as a CLOSE operation that may begin with the series resistor in-circuit. At a predefined time, the resistor is switched out, causing maximum available battery voltage to be applied to the switch. The purpose of this two-step sequence is to begin operation under low torque, considering that serious icing conditions could limit travel. Although this is an unlikely circumstance, if it were to occur with the switch operating at high torque, unnecessary damage to the switch could occur.

The control sequence is initiated by the control logic shown in FIG. 9 and supervised by the control logic shown in FIG. 10. Referring to FIG. 10, the control logic starts the timer interrupt (1001) and waits for the movement sequence to complete. As part of the timer interrupt discussed above, the command is intercepted, the motor turned on and off at the appropriate time, and the interrupt then returns once the motor has stopped spinning. During the timer interrupt, once the series resistor is switched out, the motor rapidly reaches maximum speed of travel as it approaches the switch contacts. This sequence of operations, from the point of turning on the motor to the point where the actuator stops moving is handled entirely by the timer and encoder interrupts described previously. The CLOSE operation sequence then resumes to check the results of the operation (1002, 1003, 1005). "Motor Overload" or "Short Travel" (1002, 1003) are positive indications that a mechanical blockage problem has very likely occurred. The most critical aspect of the CLOSE operation is that the switch contacts ultimately land firmly and are held solidly against their mating surfaces at the end of the operation sequence. Since mechanical blockage almost ensures that this will not be the case, the control takes immediate, emergency action to reverse travel to the safer, OPEN position (1004, see EMERGENCY OPEN below). Without this logic, previous designs would have failed with the switch partially closed. This would create a very high probability of arcing and fire if the switch was (or subsequently became) energized. In the case of M1s installed in circumstances without the potential for icing conditions, the EMERGENCY OPEN operation step may optionally not be executed, and instead the switch may enter the "Internal Error" state (1006). Unrecoverable errors (1005) are caused by such things as internal programming inconsistencies, illegal states, invalid checksums on protected data or other problems caused by failed hardware that are beyond the ability of the software to fully diagnose. These problems result in conditions that require the user to recalibrate the operator and clear the error indication locally with the setup software.

Under normal circumstances, the actuator shaft will land at its intended position within one degree or less of error. However, mechanical/environmental variants can cause incomplete travel. To minimize the impact of such drift, after the "HIGH TORQUE CLOSE" is completed, a second, "LOW TORQUE CLOSE" operation (1007) is initiated to ensure that the switch contacts are firmly mated. This operation is identical to the high torque variant except that the series load resistor is continuously switched into the circuit. This generates a current-limited operation which yields a maximum stall torque of nominally 100 ft.-lbs. to the actuator (adjustable by modifying the load resistor). After the motor stops, a check is made for internal errors (1008) and the logic gives up if found. At this point in the logic, motor overload should not occur due to the current limiting feature of the series load resistor. Thus, motor overload is an unrecoverable logic error at this point. At the end of this second operation, actuator travel is examined (1009). If the low torque operation resulted in no travel, the operation is considered complete. If travel exceeded a specific threshold, an indication that the operator is mechanically uncoupled or "disengaged" from the switch is generated (1013). If travel was otherwise greater than zero, the operation is repeated until the actuator rod is firmly held in position without any motion.

By "torque-ing-up" on the actuator shaft, we provide additional assurance that the switch contacts are held with positive force against their mating surfaces. Without this assurance that the switch contacts are firmly held in position, the possibility exists for repeated arcing and vibration of the switch contacts, causing eventual welding or catastrophic failure of the switch.

Finally, a comparison is made of the actuator position to the desired stopping end point (1010). If the position is within a pre-configured range, the operation completes normally (1012). If the actuator ended outside its intended stopping range, the "Recalibration Required" indication is generated (1011). This could also indicate a mechanical problem or failure requiring inspection.

Normal OPEN Operation

FIG. 11 provides an overview of the sequence of operations associated with opening of the switch under normal circumstances. General comments associated with the "Normal CLOSE Operation" above also apply to the open operation, additional specific details are described below:

First, a "LOW TORQUE CLOSE" operation is initiated (1101) to determine if the operator is decoupled (1105, 1106) from the switch (signaled by excessive travel) or otherwise malfunctioning (1102, 1103, 1104). This operation also Ensures that the switch mechanism is tensioned in the closed position. Thus, when the directly following "OPEN" operation is executed, movement of the control rod and switch mechanism is maximized. In the case of a partially welded, frozen or corroded switch contact, this provides some swinging movement to help free the blockage.

Next, a "HIGH TORQUE OPEN" operation is initiated (1107) to actually open the switch. Full motor speed and torque is desirable for this step to minimize the amount of time that the switch contacts are within close distance of their mating surfaces. Preferably, the contacts separate by more than several inches within one or two, 60 Hz cycles (16.6–33.2 ms), to minimize high voltage arcing through free air.

In the event that one or more of the switch contacts are stuck, or there is a mechanical blockage, and the switch cannot be fully opened, motor overload or short travel (1108) will be detected. The logic distinguishes between operator travel less than 50% or greater than 50% of full travel. Less than 50% travel indicates a probably stuck contact or ice. This triggers an immediate, "EMERGENCY CLOSE" operation (1110) to return the switch to its fully-closed position. This recovery operation prevents the switch from coming to a final resting position partially opened, and minimizes the otherwise high likelihood of switch damage and possible fire. Greater than 50% travel indicates that some form of blockage or problem prevents the switch from fully opening. Since the likelihood of ice buildup on the open switch position stops is extremely unlikely, the control logic raises and internal error indication (1109) and waits for a local operator to resolve the problem. This condition can also be raised by other internal errors as discussed above for the CLOSE operation.

Under normal circumstances, the actuator shaft will land at its intended position within one degree or less.. At the end of this second operation, actuator position is examined (1114). A comparison is made of the actuator position to the desired stopping end point. If the position is within a pre-configured range, the operation completes normally with the OPEN indication (1116). If the actuator ended beyond its intended stopping end point, an internal error is generated (1113). This is because the switch, once clear of the mating contacts, is operating against very low forces and is expected to reliably reach its final, OPEN stopping end point. If the operator ended short of its desired stopping end point, the OPEN limit position setting is wrong and generates the "calibration required" indication (1115).

Emergency OPEN/CLOSE Operations

Emergency OPEN/CLOSE operations (FIG. 12) are automatic sub-operations to quickly position the switch in a safer condition after a severe problem (such as encoder failure) was detected during a normal operation. The Emergency OPEN/CLOSE operations are invoked from the normal OPEN and CLOSE control sequences (FIGS. 10 and 11). The operations begin with the load resistor switched out of the circuit (1201). The operations complete when the timer interrupt has operated the motor to completion (1202), then update the switch position status appropriately (1203). The completion of the EMERGENCY operations set the "Recalibration Required" indication (1204) which ensures that a lineman will inspect the switch and operator before it is put back into normal service.

Override OPEN/CLOSE Operations

Due to the unique and hazardous circumstances under which the distribution switch must operate, there are times when the motor operator should be allowed to function despite internal error indications or known problems. These circumstances include external, environmental factors such as local fires, snow/ice storms and major power outages. They also include selected, internally detected circumstances such as output actuator mechanical blockage. These circumstances could leave the switch in a position where dangerous consequences such as arcing or fire could be likely. These operations can only be invoked remotely.

Switch-Operator Alignment/Coupling

A mechanical coupling secures the switch control rod to the M1 (FIG. 2, 208). When uncoupled, manual operation of the switch is possible, independent of the M1's actuator position. Typically, the coupling contains a mechanical keying mechanism to secure the two ends without the chance of slippage. During motor operator installation, or subsequently under manual control, the actuator may require rotation to enable actuator alignment prior to coupling. This capability is easily accomplished in the M1 via the low-torque "JOG" capability. This is described in a set of simple instructions included on a label or front panel silkscreen shown in FIG. 6a. The relationship of these instructions to the control's internal operation is described below.

As with all operator functions, front panel operation requires that the "Local/Remote" switch be in the "Local" position. A spring-loaded, front panel switch labeled "Align/Couple" and an LED labeled "Not Ready" facilitate the alignment process. By momentarily raising the switch, the "Not Ready" LED will blink, unless the battery is too low to operate the switch. This signals the beginning of "align" mode or slow, incremental, low-torque movement of the actuator. By momentarily raising or lowering the "Open/Close" switch, the actuator can then be "Jogged" slowly open or closed. When the desired actuator position is reached, the mode can be exited by once again toggling the "Align/Couple" switch.

Switch Calibration (Setting Limits of Travel)

FIG. 6b shows the brief description of the procedure for setting the stored limits of travel of the actuator. The procedure requires that the switch be positioned in the closed, un-tensioned position in preparation for the "set limits" operation to be performed (Step III). By simultaneously raising the "Set Limits" and the "Closed" switches, the user indicates that the "Closed" limit is to be set. The logic then fully closes and tensions the switch using the "Jog" operation. The operation completes and sets the CLOSED switch position by storing in memory a "stopping end point" at the point when continued "Jog" commands cease to result in movement of the actuator. This applies nominally 100 ft.-lbs of torque to the control rod.

The "OPEN" stopping end position is determined by allowing the user to "Jog" the actuator to a position near the "Open" mechanical switch stops. The software stores this position as the when the user signals that the correct position has been achieved by simultaneously raising the "Set Limits" and the "Open" switches.

In order to test the limits of travel without moving the switch, the user can decouple the mechanism and execute a "Test" operation. This is requested by simultaneously raising both the "Align/Couple" switch and either raising or lowering the "Open/Close" switch. This allows fast actuator motion without performing the low-torque operations otherwise used to detect the uncoupled condition.

Battery Test

A key requirement of the M1 is to be able to deliver consistent operation over a varying level of energy stored in the battery system, to be able to detect when the battery system is unable to deliver the minimum required energy and correspondingly disable operation. The critical parameter for the M1 is the voltage delivered to the motor when its rotor is "locked" or held against a heavy load due to ice blockage or contact welding. Since the motor is a DC permanent magnet motor, locked rotor torque is directly proportional to supply voltage. The locked rotor resistance of the motor is approximately constant (in our case approximately 0.039 ohms). Thus, a key element of the battery test methodology is to calculate the voltage that the battery will deliver with the motor as modeled by a 0.039 ohm resistor. If this voltage corresponds to a motor torque below the desired minimum, a "Bad Battery" indication is generated and switch operation is disabled.

Figure 13A:
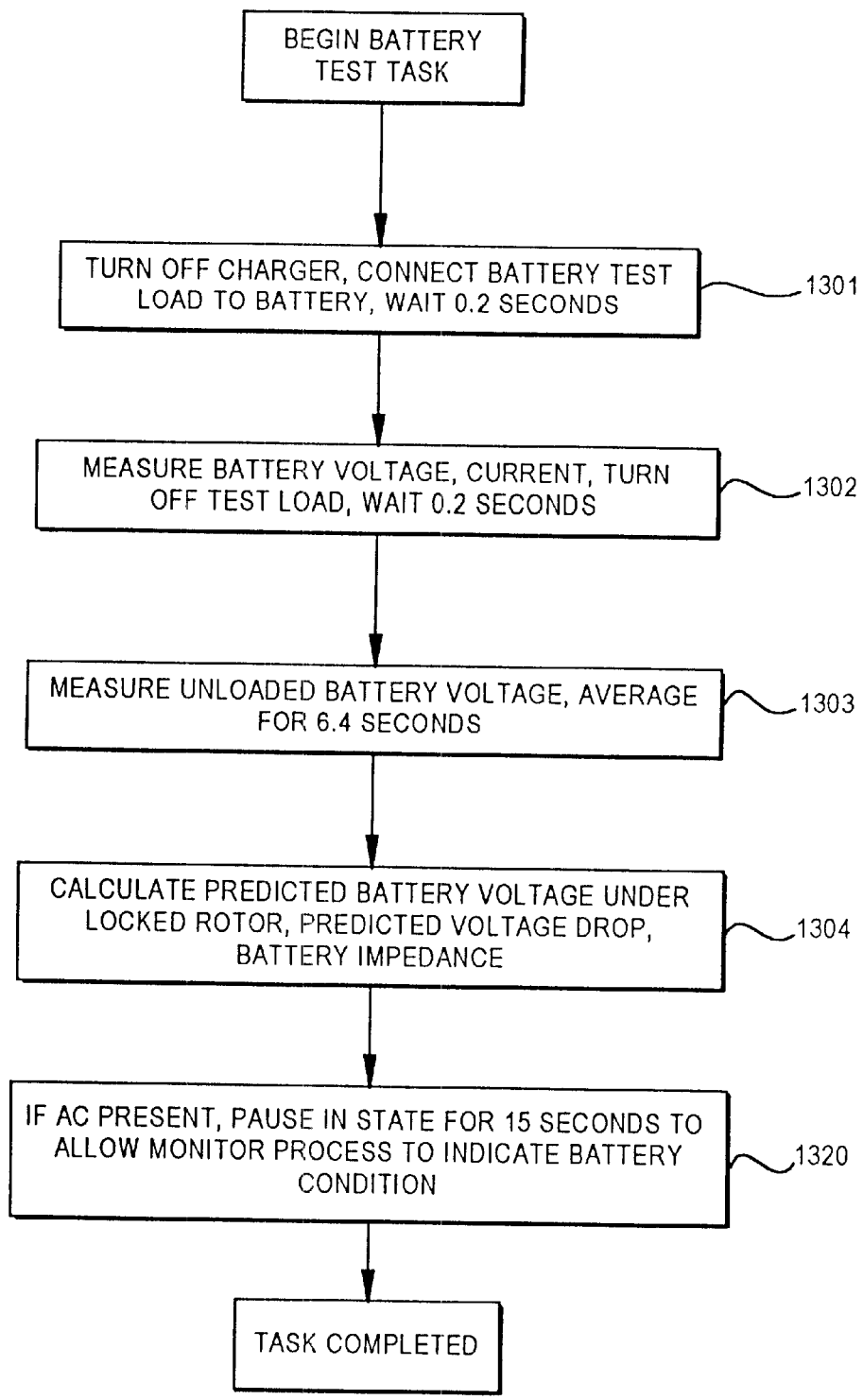
FIGS. 13a and 13b are flow charts of the programmed battery test.

Referring to FIG. 13a, the battery test methodology begins by turning off the battery charger under microcontroller control, and connecting the battery test resistor across the batter terminals (1301). The nominal size of the resistor is approximately 0.25 ohms, although different sizes and accuracies of resistors can be used. Since both battery voltage and current are monitored, the precise resistance is not needed by the calculation, but can be calculated. After a 0.2 second delay to allow the voltage to drop, stabilize and be sampled, the battery voltage and current are measured. calculating the battery impedance in the presence of the battery test load (1302, the nominal 0.25 ohm resistor is switched in series with the battery.). The battery is shorted through the resistor and both current and voltage under load are measured (the software turns off the battery charger if it is on before beginning the test). Then the resistor is switched out and the battery voltage measured again (1302, 1303). This latter measurement (1303) provides a battery voltage under no load conditions. The formula below can then be used to calculate the approximate battery voltage (1304) as would be measured with the motor connected in a locked rotor state:

$$Vload=(Vnom*Rmot*Itest)/(Vnom-Vtest+(Rmot*Itest))$$

where:

Vload Calculated battery voltage under locked rotor conditions

Vnom Unloaded (nominal) battery voltage

Rmot Motor locked rotor internal impedance

Itest Current measured with test load applied

Vtest Voltage measured with test load applied

The formula above is an approximation because the battery impedance is to some extent load dependent. The voltage drop under a large load is not directly proportional to the voltage drop under a smaller load. The battery maintains better (higher) high-load voltage than would be otherwise expected. During the useful portion of the battery's discharge curve (approximately 50% of manufacturer's low discharge rating), this proportionality is linear. A typical proportionality constant is 1.6 for the 33 amp-hour lead-acid battery used in the preferred implementation, yielding the following formula:

$$Vpred=(Vtest-Vload)*1.6$$

Where:

Vpred Predicted voltage drop under locked rotor using specified battery

This formula is calculated as the final result of the test (1304). This test is performed daily under normal operating conditions (AC present). Its performed once per hour while the battery is discharging (AC non present), and every other hour for the first two days after AC power is restored.

Under normal conditions, the battery charger is constantly applying a float voltage to the battery system. This imparts a higher voltage on the battery, due to the well-known effects of surface charge. This charge must be removed from the battery before sampling its unloaded voltage, Vnom. By making the measurement of unloaded voltage after the test load is applied and removed (and with the charger turned off), a reliable measurement of unloaded battery voltage can be made without applying smaller loads to drain the surface charge.

Figure 13B:
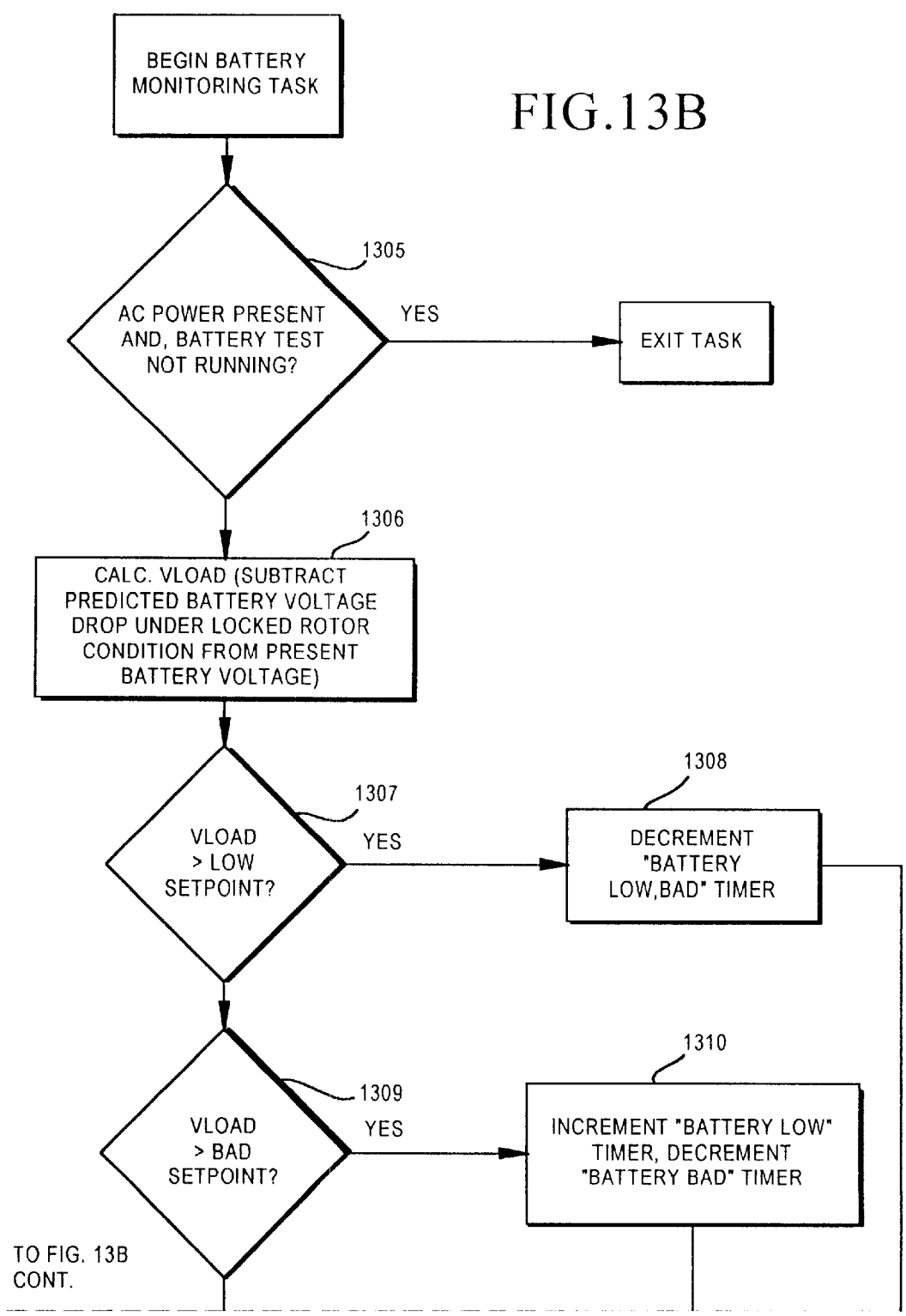
Figure 13B:
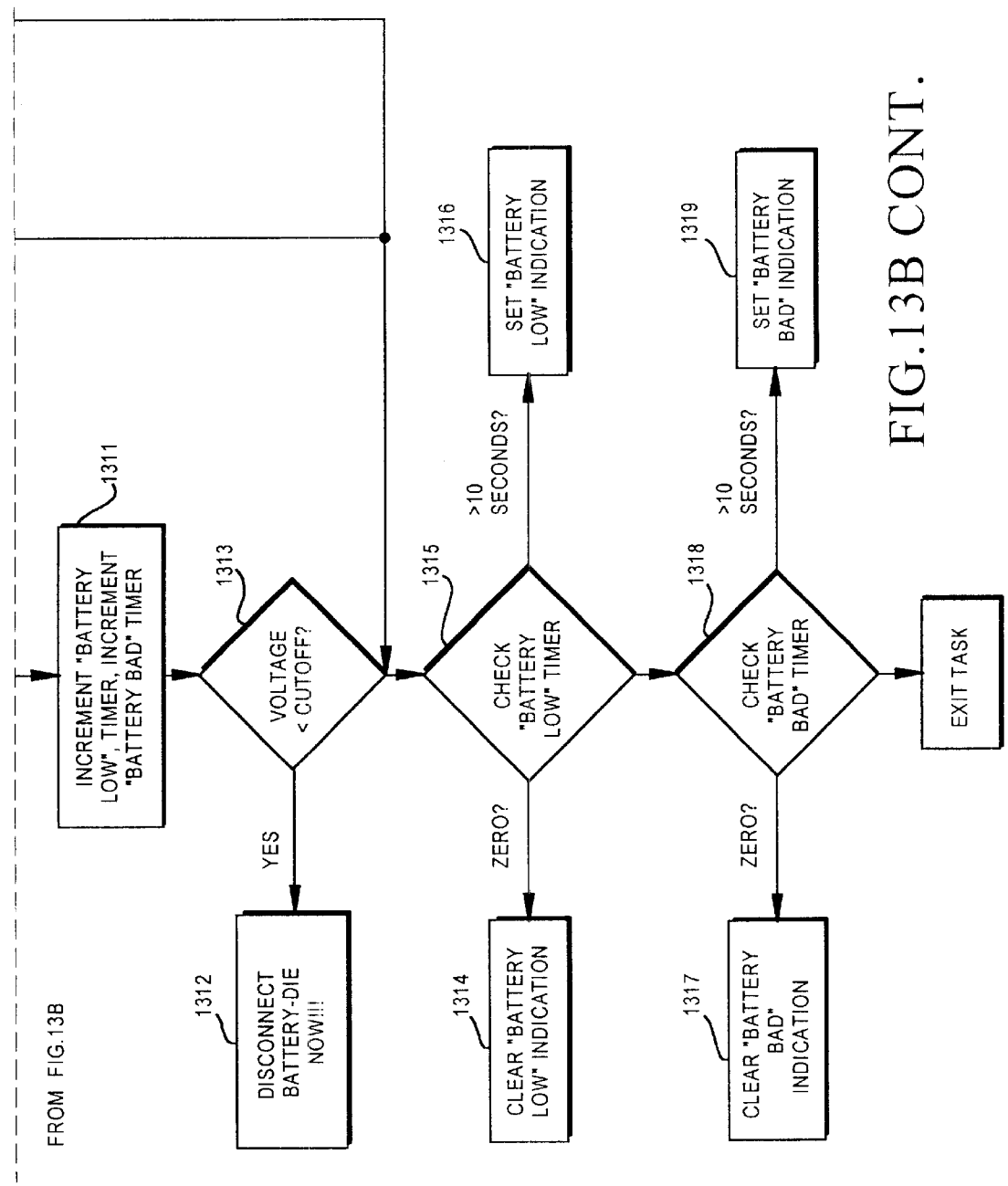

Battery system monitoring is accomplished through a separate but related process as shown in FIG. 13*b*. This monitoring is active when AC is present and the battery test is running or when AC is not present and the system is being discharged (1305). The monitoring is based on the most-recent value of the battery voltage with the battery disconnected from the charger. Thus, the monitoring is only active on AC power for a brief period towards the end of the battery test when the charger and test loads have been turned off (1320). Predicted voltage during locked rotor conditions is calculated based upon the current battery voltage without surface charge, Vnom, minus the predicted voltage drop under locked rotor conditions (1306). This predicted voltage is compared to a warning level setpoint (1307) and a "battery bad" level setpoint (1309) and if these conditions persist (1308, 1310, 1311, 1315, 1318), the appropriate indications are generated (1316, 1319). If the conditions improve, such as during battery charging, the conditions are cleared (1314, 1317). An additional test of unloaded battery voltage, Vnom, is made (1313) to determine if the battery has been discharged to a point where it can no longer support even the small loads generated by the control computer and communications equipment. At this level, the control computer shuts off power to the whole system (1312), preventing damage to the batteries.

Alternative Embodiments

Various modifications are anticipated. The foregoing disclosure is of the preferred embodiment and it will be apparent to persons of ordinary skill in the art the numerous changes and modifications can be made thereto including the use of equivalent devices and method steps without departing form the spirit and intent of the invention.

For example, this design utilizes electromechanical relays and high-current motor contactors to switch the motor on/off, to reverse the direction of travel, and to switch the load resistor in/out of circuit. High-current, solid-state switching devices may also be used. These components have the advantage of greater and more precise switching speed, and the ability to control motor torque accurately and rapidly. Minor modifications to the present embodiment of the invention could easily accommodate these components.

When abnormal conditions occur, such as motor overload and short actuator travel, the present embodiment makes predefined decisions for corrective action. Customers in different geographical areas will undoubtedly request different corrective actions based upon the perceived likelihood of the failure encountered. For example, a customer in the desert may want the result of a CLOSE operation with motor overload to cause the M1 to halt operation entirely because the most likely cause of overload is internal equipment failure. These individual corrective actions may be preferentially embodied in setup parameters that allow the customer to decide what actions are to be taken.

The present (torsional) embodiment handles switches operated with a rotating control rod. Many air-break distribution switches are operated with reciprocating handles (reciprocating). The reciprocating unit can be easily constructed by mounting the output shaft horizontally and attaching a cylindrical coupling to convert the rotational action into a reciprocating one, or by utilizing a gearbox assembly that converts motor rotation to a linear output shaft movement.

In some existing motor operators, the driving force is supplied by hydraulic components which are in turn fed and controlled with motor-driven pumps and valves. These hydraulic systems can benefit from the methods embodied in the existing design with only minor modifications. For example, actuator speed and position could be measured on the output shaft, and automatic direction reversal initiated if the output shaft did not land within a predefined distance of its target position.

The existing control logic makes limited use of the external termperature sensor in determining the presence of icing conditions. With minor modifications to the control logic, motor overload or incomplete travel in conjunction with icing conditions could be automatically detected and trigger an ice-breaking mode in which rapid open/close operations are performed to free the ice from the switch blades.

What is claimed is:

1. An operator for an overhead electrical power switch, in which operator comprises:

a controlled motor drive adapted to be coupled to an overheas electrical power switch;

motor drive position sensor producing a signal representing motor drive position; and dynamic controller for controlling said motor drive in response to the signal produced by said motor drive position sensor, wherein said dynamic controller has a switch opening mode that includes first applying power to the motor drive to drive the switch closed and then applying power in a reverse direction to drive the switch open.

2. A method to detect the coupled state of an operator having a switch that is driven by a motor drive adapted to be coupled to the switch through an actuator, the method comprising the steps of:

when opening the switch from a closed position, initially controlling the motor drive to drive the switch in a closing direction in a first low torque mode of operation;

sensing if the motor drive exceeds a predetermined amount of travel beyond the closed position; and indicating an operator disengaged condition if the motor drive exceeds the predetermined amount of travel.

3. The method of claim 2 further comprising the step of controlling the motor drive to drive the switch in a second high torque mode of operation in an opening direction reverse to the closing direction if the motor drive does not exceed the predetermined amount of travel in the sensing step.

4. An operator for an overhead electrical switch, in which the operator comprises:

a controlled motor drive adapted to be coupled to an overhead electrical power switch;

motor drive position sensor producing a signal representing motor drive position; and a dynamic controller for controlling said motor drive in response to the signal produced by said motor drive position sensor, said dynamic controller having a switch opening mode that initially controls said motor drive to drive the switch in a closing direction in a first low torque mode of operation, senses if said motor drive exceeds a predetermined amount of travel beyond a predetermined closed position, indicating an operator disengaged condition said motor drive exceeds said predetermined amount of travel in said first low torque mode, and controlling said motor drive to drive the switch in a second high torque mode drive does not exceed said predetermined amount of travel in said first low torque mode of operation.

5. A digital controller for an electrical power switch driven by a motor drive that engages the electrical power switch, the digital controller comprising:

a first input adapted for receiving a switch command signal for commanding an open or closed state of a switch;

a second input adapted for receiving an electrical signal representing motor drive position;

a processor having switch opening and closing modes for turning on power to the electrical power switch to drive it in respective opening and closing directions toward its open or closed states, respectively;

a memory for storing stopping point positions for the motor drive and turning off power in response to reaching said stored motor stopping point position; said switch opening mode comprising a first low torque mode for initially controlling said motor drive to drive the electrical power switch in the closing direction while sensing if the motor drive exceeds a predtermined amount of travel beyond a closed stored motor stopping position and indicating a motor drive disengaged condition if the motor drive exceeds said predetermined amount of travel in said first low torque mode, said switch opening mode further comprising a second high torque mode of operation and controlling said motor drive to drive the switch in the opening direction if the motor drive does not exceed the predetermined amount of travel in said first low torque mode of operation.

* * * * *

UNITED STATES PATENT AND TRADEMARK OFFICE
CERTIFICATE OF CORRECTION

PATENT NO. : 6,456,025 B2
DATED : September 24, 2002
INVENTOR(S) : Donald B. Berkowitz et al.

It is certified that error appears in the above-identified patent and that said Letters Patent is hereby corrected as shown below:

Column 25,
Line 8, after "which", please insert -- the --.
Line 10, please replace "overheas" with -- overhead --.

Column 26,
Line 12, after "mode", please insert -- of operation in an opening direction reverse to the closing direction if said motor --.
Line 29, after "position;", please insert a hard return so "said" starts a new paragraph.
Line 33, please replace "predtermined" with -- predetermined --.

Signed and Sealed this

Eleventh Day of March, 2003

JAMES E. ROGAN
*Director of the United States Patent and Trademark Office*